(12) United States Patent
Park et al.

(10) Patent No.: US 8,914,627 B2
(45) Date of Patent: Dec. 16, 2014

(54) METHOD FOR GENERATING A SECURED BOOT IMAGE INCLUDING AN UPDATE BOOT LOADER FOR A SECURED UPDATE OF THE VERSION INFORMATION

(75) Inventors: Dong-Jin Park, Hwaseong-si (KR); Myung-Hee Kang, Seoul (KR); Won-Churl Jang, Uijeongbu-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 344 days.

(21) Appl. No.: 13/279,512

(22) Filed: Oct. 24, 2011

(65) Prior Publication Data

US 2012/0210115 A1  Aug. 16, 2012

(30) Foreign Application Priority Data

Feb. 11, 2011  (KR) .................. 10-2011-0012119

(51) Int. Cl.
*G06F 9/00* (2006.01)
*G06F 15/177* (2006.01)
*H04L 9/32* (2006.01)
*G06F 21/57* (2013.01)
*H04W 12/06* (2009.01)
*G06F 9/44* (2006.01)

(52) U.S. Cl.
CPC ............ *H04L 9/3242* (2013.01); *H04L 9/3247* (2013.01); *G06F 21/575* (2013.01); *H04W 12/06* (2013.01); *G06F 9/4401* (2013.01); *G06F 2221/034* (2013.01)

USPC .............................................................. 713/2

(58) Field of Classification Search
CPC ...................................................... G06F 9/4401
See application file for complete search history.

(56) References Cited

U.S. PATENT DOCUMENTS

| | | | |
|---|---|---|---|
| 5,608,801 A * | 3/1997 | Aiello et al. | 380/46 |
| 6,907,522 B2 | 6/2005 | Morais et al. | |
| 2006/0064576 A1 * | 3/2006 | Chen | 713/2 |
| 2007/0006320 A1 | 1/2007 | Paul et al. | |
| 2008/0165952 A1 * | 7/2008 | Smith et al. | 380/28 |
| 2010/0122076 A1 * | 5/2010 | Witty | 713/2 |
| 2011/0307711 A1 * | 12/2011 | Novak et al. | 713/188 |

FOREIGN PATENT DOCUMENTS

JP  2005-165417  6/2005
KR  10-2009-0007123  1/2009

OTHER PUBLICATIONS

English Abstract for Publication No. 2005-165417.
English Abstract for Publication No. 10-2009-0007123.

* cited by examiner

*Primary Examiner* — Thomas Lee
*Assistant Examiner* — Gayathri Sampath
(74) *Attorney, Agent, or Firm* — F. Chau & Associates, LLC

(57) ABSTRACT

In a secure boot method, an initial boot loader verifies a first digital signature included in a first boot loader using a public key. The first boot loader is executed if the first digital signature is valid. The first boot loader verifies a first message authentication code included in a second boot loader using a unique key. The second boot loader is executed if the first message authentication code is valid.

17 Claims, 18 Drawing Sheets

METHOD FOR GENERATING A SECURED BOOT IMAGE INCLUDING AN UPDATE BOOT LOADER FOR A SECURED UPDATE OF THE VERSION INFORMATION

CROSS-REFERENCE TO RELATED APPLICATIONS

This U.S. non-provisional application claims the benefit of priority under 35 U.S.C. §119 to Korean Patent Application No. 2011-0012119 filed on Feb. 11, 2011 in the Korean Intellectual Property Office (KIPO), the entire content of which is herein incorporated by reference in its entirety.

BACKGROUND

1. Technical Field

The present disclosure relates to boot methods, and more particularly, to secure boot methods and methods of generating secure boot images.

2. Description of Related Art

A computing system performs a boot operation, which initializes devices and loads an operating system (OS) or a kernel by executing a boot image. If the computing system is booted using an unauthenticated boot image, illegal or malicious software may be executed in the computing system, and the computing system may be readily cloned.

In view of the foregoing, the integrity of a boot image is a component in system security.

SUMMARY

According to exemplary embodiments, in a secure boot method, an initial boot loader verifies a first digital signature included in a first boot loader using a public key. The first boot loader is executed if the first digital signature is valid. The first boot loader verifies a first message authentication code included in a second boot loader using a unique key. The second boot loader is executed if the first message authentication code is valid.

In some embodiments, to verify the first digital signature, the public key may be read from a public key storing unit, and integrity of an execution image included in the first boot loader may be checked by verifying the first digital signature using the read public key.

In some embodiments, to verify the first message authentication code, the unique key may be read from a unique key storing unit, a message authentication code may be generated using the read unique key and an execution image included in the second boot loader, and the generated message authentication code may be compared to the first message authentication code.

In some embodiments, the unique key may be read from the unique key storing unit via a unique key firewall, and the unique key firewall may be configured to block an access to the unique key storing unit after a boot operation is completed.

In some embodiments, the unique key storing unit may be set as a secure peripheral device, and may be inaccessible after a boot operation is completed.

In some embodiments, a physical address of the unique key storing unit may not be included in mapping information managed by a memory management unit.

In some embodiments, the public key may be read from a public key storing unit, and a second digital signature included in the second boot loader may be verified using the read public key. The second boot loader may be executed if the first message authentication code and the second digital signature are valid.

In some embodiments, a second digital signature included in the second boot loader may be verified using a public key included in the first boot loader. The second boot loader may be executed if the first message authentication code and the second digital signature are valid.

In some embodiments, the second boot loader may compare first purpose information included in the first boot loader to second purpose information included in the second boot loader, and a system may be terminated if the first purpose information does not match the second purpose information.

In some embodiments, a first build number included in the second boot loader stored in a nonvolatile memory device may be compared to a second build number included in an update boot loader stored in a volatile memory device, the second boot loader may be overwritten with the update boot loader in the nonvolatile memory device if the second build number is higher than the first build number, a message authentication code may be generated using the unique key and an execution image included in the update boot loader, and the generated message authentication code may be written as the first message authentication code to the update boot loader stored in the nonvolatile memory device.

In some embodiments, the second boot loader may verify a second message authentication code included in a kernel using the unique key, and the kernel may be executed if the second message authentication code is valid.

According to exemplary embodiments, in a method of generating a secure boot image of a system performing a secure boot operation, a boot image and a preliminary boot image are written to a nonvolatile memory device included in the system. An initial boot loader verifies a digital signature included in the boot image using a public key. The boot image is executed if the digital signature is valid. The boot image requests an authentication. An execution boot image is generated based on the preliminary boot image and a message authentication code generated using a unique key.

In some embodiments, the unique key is unique to the boot image among a plurality of copies of the boot image.

In some embodiments, to request the authentication, a first password may be received, and the first password may be compared to a second password included in the boot image.

In some embodiments, to request the authentication, an encrypted message may be generated by encrypting an original message using a public authentication key included in the boot image, a response message may be generated by decrypting the encrypted message using a private authentication key corresponding to the public authentication key, and the response message may be compared to the original message.

In some embodiments, the preliminary boot image may include a first preliminary boot loader, a second preliminary boot loader and a preliminary kernel. To generate the execution boot image, the boot image may be removed from the nonvolatile memory device, the first preliminary boot loader, the second preliminary boot loader and the preliminary kernel may be moved to locations corresponding to a first boot loader, a second boot loader and a kernel in the nonvolatile memory device, respectively, and a first message authentication code and a second message authentication code may be written to the moved second preliminary boot loader and the moved preliminary kernel, respectively.

According to exemplary embodiments, a secure boot system includes an integrated circuit having a processor for executing a boot image having a message authentication code and a digital signature, and a unique key storing unit storing a unique key for authenticating the message authentication code.

In some embodiments, the unique key storing unit further includes a memory device storing the unique key, a unique key firewall, and a control circuit controlling the unique key firewall not to output the unique key after a boot operation is completed by the secure boot system.

In some embodiments the memory device is one-time programmable.

In some embodiments, the processor further comprises a secure kernel in communication with the unique key storing unit.

In some embodiments, the secure boot system further includes a memory management unit disposed between the processor and the unique key storing unit, wherein the memory management unit does not store a physical address of the unique key storing unit.

As described above, in a secure boot method according to exemplary embodiments, a system may authenticate a boot image using a unique key that is unique for each system, and thus may perform a secure boot operation using the authenticated boot image. Further, a method of generating a secure boot image according to exemplary embodiments may mass-produce a plurality of systems having unique keys that are unique for each system.

BRIEF DESCRIPTION OF THE DRAWINGS

Illustrative, non-limiting exemplary embodiments will be more clearly understood from the following detailed description taken in conjunction with the accompanying drawings.

DETAILED DESCRIPTION OF EXEMPLARY EMBODIMENTS

Figure 1:
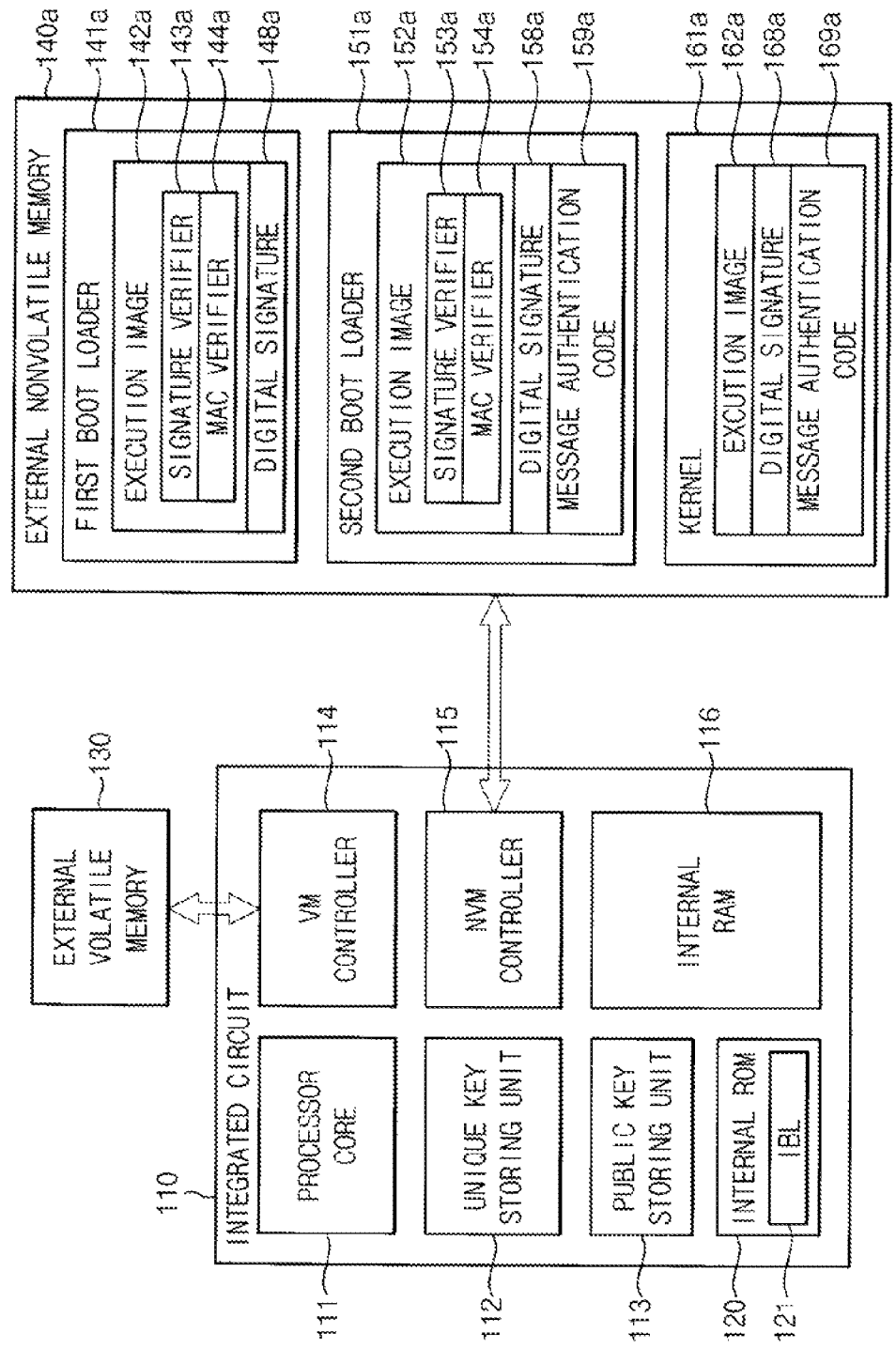
FIG. 1 is a block diagram illustrating a system performing a secure boot operation according to exemplary embodiments.

Various exemplary embodiments will be described more fully hereinafter with reference to the accompanying drawings, in which some exemplary embodiments are shown. Inventive concepts may, however, be embodied in many different forms and should not be construed as limited to exemplary embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a system for performing a secure boot operation according to an exemplary embodiment of the present disclosure.

Referring to FIG. 1, a system 100a includes an integrated circuit 110, an external volatile memory device 130 and an external nonvolatile memory device 140a.

The integrated circuit 110 includes a processor core 111, a unique key storing unit 112, a public key storing unit 113, a volatile memory (VM) controller 114, a nonvolatile memory (NVM) controller 115, an internal volatile memory device 116 (e.g., a random access memory (RAM)) and an internal nonvolatile memory device 120 (e.g., a read-only memory (ROM)). The processor core 111 may fetch an instruction or data, and may process the fetched instruction or data. According to exemplary embodiments, the integrated circuit 110 may be an application processor (AP), a microprocessor, a central processing unit (CPU), or the like.

The unique key storing unit 112 may store a unique key that is unique to the system. That is, different systems have different unique keys. The unique key may be referred to as a Device Unique Secret Key (DUSK). In some embodiments, the unique key may be used during a boot operation. In other embodiments, a key may be derived from the unique key using a key derivation function (KDF), and the derived key may be used during the boot operation. For example, the unique key storing unit 112 may be implemented by a one-time programmable (OTP) memory, a mask ROM, a programmable read-only memory (PROM), an erasable programmable read-only memory (EPROM), an electrically erasable programmable memory (EEPROM), a flash memory, or the like.

The public key storing unit 113 may store a public key for verifying digital signatures 148a, 158a and 168a. Alternatively, the public key storing unit 113 may store information related to the public key, and the public key may be provided from an external device by using the related information during the boot operation. For example, the public key storing unit 113 may be implemented by an OTP memory, a ROM, a PROM, an EPROM, an EEPROM) a flash memory, or the like.

The volatile memory controller 114 may control an operation of the external volatile memory device 130, and the nonvolatile memory controller 115 may control an operation of the external nonvolatile memory device 140a. For example, the volatile memory controller 114 may control the external volatile memory device 130 to perform a read operation or a write operation, and the nonvolatile memory controller 115 may control the external nonvolatile memory device 140a to perform a read operation or a write operation.

The internal volatile memory device 116 may serve as a cache memory or a working memory for the processor core 111. For example, the internal volatile memory device 116 may be implemented by a RAM, such as a static random access memory (SRAM), an embedded dynamic random access memory (EDRAM), etc.

The internal nonvolatile memory device 120 may store an initial boot loader 121. For example, the internal nonvolatile memory device 120 may be implemented by an OTP memory, a ROM, a PROM, an EPROM, an EEPROM, a flash memory, or the like. Once the system 100a is powered on, the initial boot loader (IBL) 121 may be executed. The initial boot loader 121 may include signature verification code that verifies a first digital signature 148a included in a first boot loader 141a. The signature verification code may be referred to as a "signature verifier." The initial boot loader 121 may initialize the nonvolatile memory controller 115 and/or the volatile memory controller 114, and may load the first boot loader 141a from the external nonvolatile memory device 140a into the internal volatile memory device 116 or the external volatile memory device 130. According to exemplary embodiments, the unique key storing unit 112, the public key storing unit 113 and the internal nonvolatile memory device 120 may be implemented as separate nonvolatile memory devices, or at least two of the unique key storing unit 112, the public key storing unit 113 and the internal nonvolatile memory device 120 may be implemented as one nonvolatile memory device.

The external volatile memory device 130 may serve as a main memory. For example, the external volatile memory device 130 may be implemented by a dynamic random access memory (DRAM), a static random access memory (SRAM), a mobile DRAM, or the like.

The external nonvolatile memory device 140a may store a boot image including a first boot loader 141a, a second boot loader 151a and a kernel 161a. For example, the external nonvolatile memory device 140a may be implemented by an EEPROM, a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The first boot loader 141a may include a first execution image 142a and a first digital signature 148a. The first execution image 142a may include an initialization code for initializing at least one device included in the system 100a, a code for loading the second boot loader 151a into the internal volatile memory device 116 or the external volatile memory device 130, a signature verification code 143a for verifying a second digital signature 158a included in the second boot loader 151a, and a message authentication code (MAC) verification code 144a for verifying a first message authentication code 159a included in the second boot loader 151a. The MAC verification code 144a may be referred to as a "MAC verifier." The first digital signature 148a may be generated by signing the first execution image 142a using a private key corresponding to the public key. When the initial boot loader 121 verifies the first digital signature 148a, the initial boot loader 121 may determine the first digital signature 148a to be invalid if the first execution image 142a has been changed. Thus, the initial boot loader 121 may check the integrity of the first execution image 142a included in the first boot loader 141a by verifying the first digital signature 148a.

The second boot loader 151a may include a second execution image 152a, the second digital signature 158a, and the first message authentication code 159a. The second execution image 152a may include an initialization code for initializing at least one device included in the system 100a, a code for loading the kernel 161a into the external volatile memory device 130, a signature verification code 153a for verifying a third digital signature 168a included in the kernel 161a, and a MAC verification code 154a for verifying a second message authentication code 169a. The second digital signature 158a may be generated by signing the second execution image 152a using the private key corresponding to the public key. The first boot loader 141a may check integrity of the second execution image 152a included in the second boot loader 151a by verifying the second digital signature 158a.

The first message authentication code 159a may be generated using the second execution image 152a along with the unique key stored in the unique key storing unit 112 or the key derived from the unique key. For example, the first message authentication code 159a may be generated by a MAC algorithm that receives the unique key or the derived key as a secret key input and receives the second execution image 152a as a message input. The MAC algorithm may employ a cryptographic hash function, a block cipher algorithm, universal hashing, or the like. For example, the MAC algorithm may be a message authentication code based on a universal hashing (UMAC) algorithm, a hash-based message authentication code (HMAC) algorithm, a cipher-based message authentication code (CMAC) algorithm, a block cipher-based message authentication code algorithm using universal hashing (VMAC) algorithm, or the like. Confidentiality and integrity of the second boot loader 151a may be maintained by verifying the first message authentication code 159a included in the second boot loader 151a.

The kernel 161a may include a third execution image 162a, the third digital signature 168a, and the second message authentication code 169a. The third execution image 162a may be loaded into the external volatile memory device 130 to operate the system 100a. The third digital signature 168a may be generated by signing the third execution image 162a using the private key corresponding to the public key. The second boot loader 151a may check the integrity of the third execution image 162a included in the kernel 161a by verifying the third digital signature 168a. The second message authentication code 169a may be generated using the third execution image 162a along with the unique key or the derived key. Confidentiality and integrity of the kernel 161a may be maintained by verifying the second message authentication code 169a included in the kernel 161a.

As described above, the system 100a according to an exemplary embodiment of the present disclosure may perform a secure boot operation with an authenticated boot image by verifying the message authentication code included in the boot image using the unique key that is unique to the system. For example, if an unauthenticated boot image or a boot image of another system is cloned to the external nonvolatile memory device 140a, the system 100a may be prevented from booting using the cloned boot image by verifying the message authentication code included in the cloned boot image.

Although FIG. 1 illustrates an example where two boot loaders 151a and 161a are stored in the external nonvolatile memory device 140a. In some embodiments, the external nonvolatile memory device 140a may store one or more boot loaders. For example, the initial boot loader 121 may load one boot loader, and the boot loader may directly load the kernel 161a. In other examples, the initial boot loader 121 and three boot loaders stored in the external nonvolatile memory device 140a are sequentially loaded, and then the kernel 161a may be loaded.

Figure 2A:
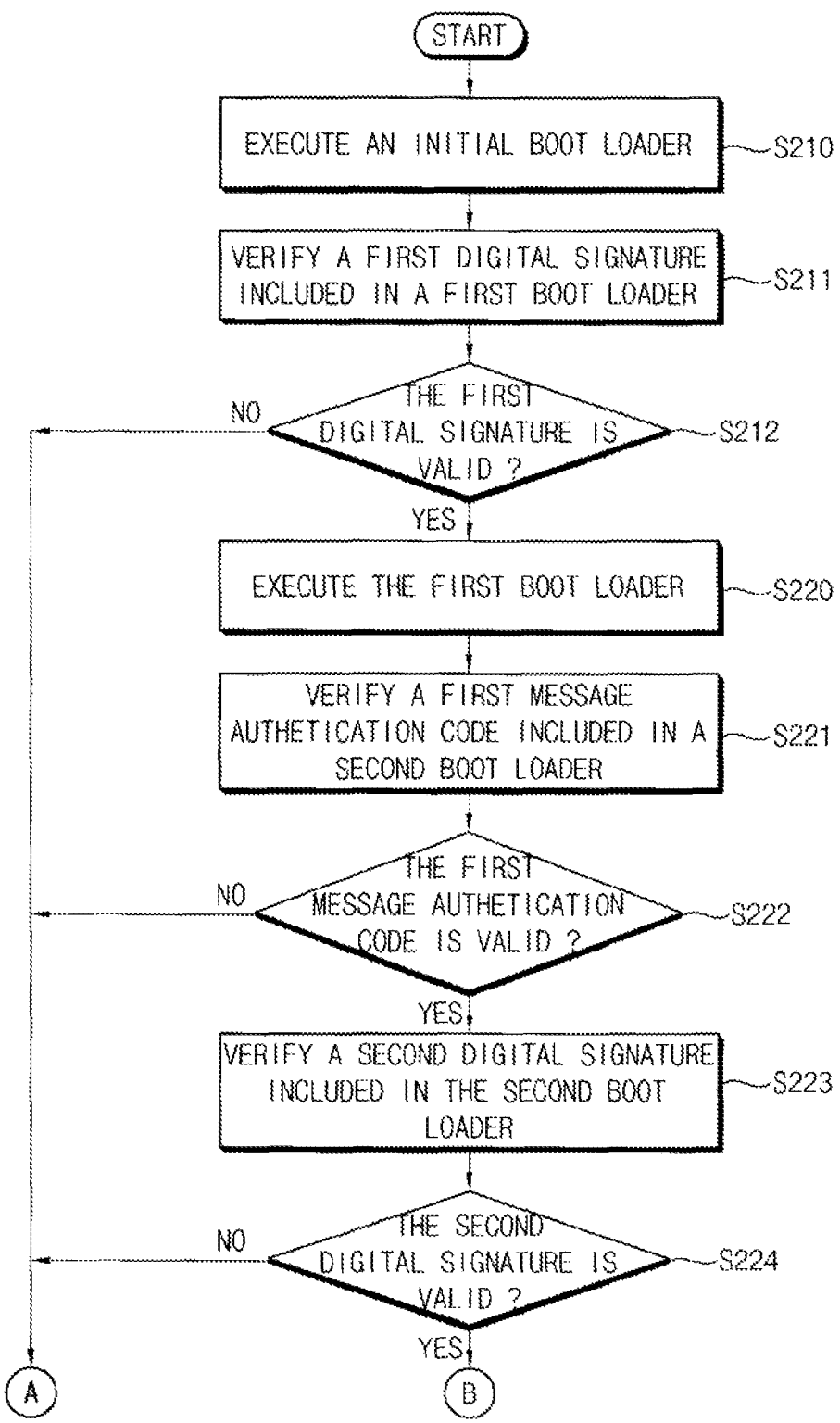
FIGS. 2A and 2B are flow charts illustrating a secure boot method according to exemplary embodiments.
Figure 2B:
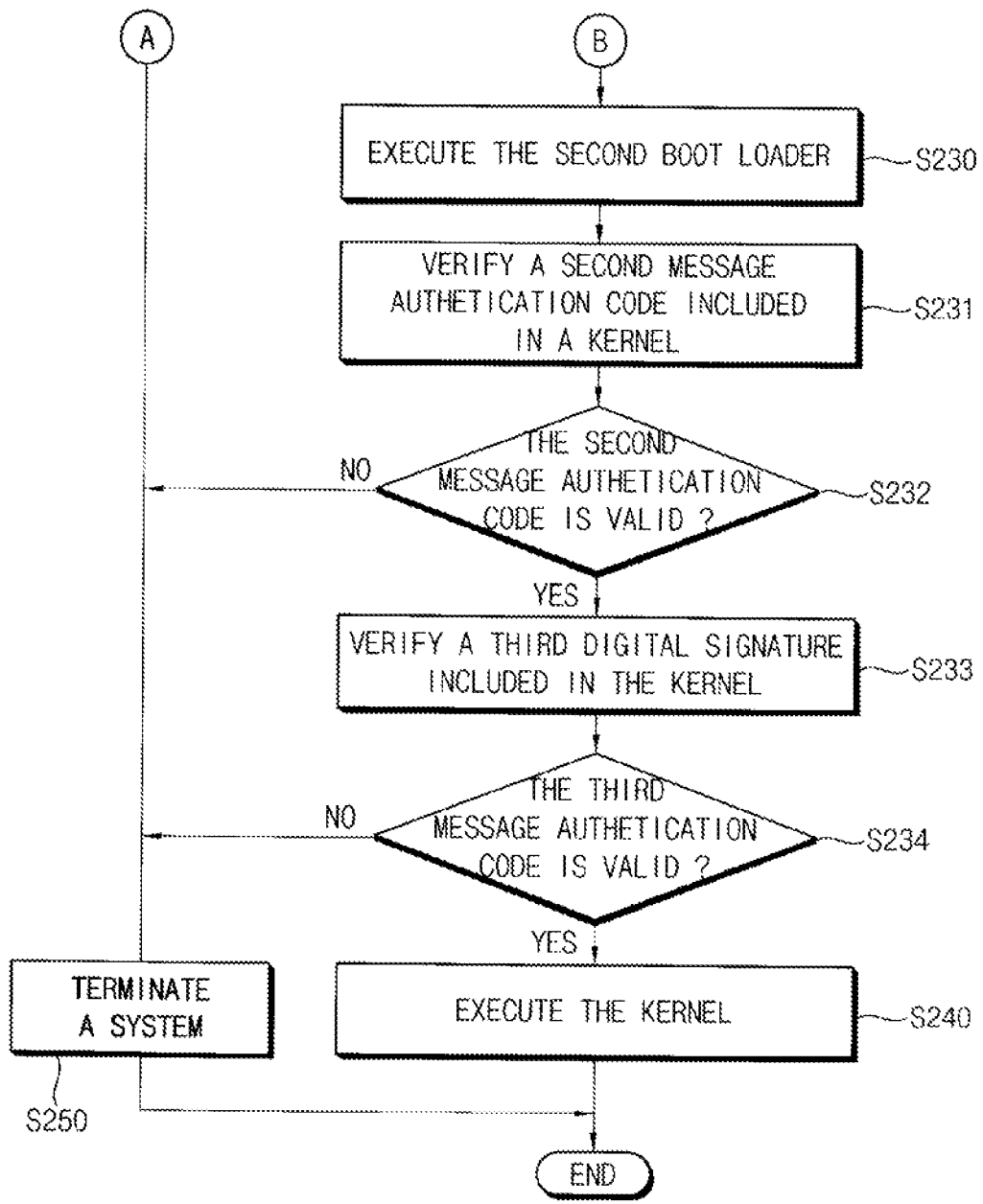

FIGS. 2A and 2B are flow charts illustrating a secure boot method according to an exemplary embodiment of the present disclosure.

Referring to FIGS. 1, 2A and 2B, a processor core 111 may execute an initial boot loader 121 stored in an internal nonvolatile memory device 120 (S210). The initial boot loader 121 may load a first boot loader 141a from an external nonvolatile memory device 140a into an internal volatile memory device 116 or an external volatile memory device 130, and may verify a first digital signature 148a included in the first boot loader 141a using a public key stored in a public key storing unit 113 (S211). For example, the initial boot loader 121 may read the public key from the public key storing unit 113, and may check integrity of a first execution image 142a by executing a signature verification algorithm on the read public key, the first execution image 142a and the first digital signature 148a. If the first digital signature 148a is invalid (S212: NO), a secure boot operation may be stopped, and a boot operation of the system 100a may be terminated (S250).

If the first digital signature 148a is valid (S212: YES), the processor core 111 may execute the first boot loader 141a (S220). The first boot loader 141a may load a second boot loader 151a into the internal volatile memory device 116 or the external volatile memory device 130, and may verify a first message verification code 159a included in the second boot loader 151a using a unique key stored in a unique key storing unit 112 (S221). For example, a MAC verification code 144a included in the first execution image 142a may read the unique key from the unique key storing unit 112, and may generate a message authentication code by executing a MAC algorithm on the read unique key and a second execution image 152a included in the second boot loader 151a. The MAC verification code 144a may check confidentiality and integrity of the second boot loader 151a by comparing the generated message authentication code to the first message verification code 159a. If the generated message authentication code does not match the first message verification code 159a, the first message verification code 159a may be determined as invalid (S222: NO), and a boot operation of the system 100a may be terminated (S250).

If the generated message authentication code matches the first message verification code 159a, the first message verification code 159a may be determined as valid (S222: YES), and the first boot load 141a may verify a second digital signature 158a included in the second boot loader 151a using the public key (S223). For example, a signature verification code 143a included in the first execution image 142a may check integrity of the second execution image 152a by executing a signature verification algorithm on the public key, the second execution image 152a and the second digital signature 158a. If the second execution image 152a or the second digital signature 158a is changed, the second digital signature 158a may be determined as invalid (S224: NO), and a boot operation of the system 100a may be terminated (S250).

If the second digital signature 158a is valid (S224: YES), the processor core 111 may execute the second boot loader 151a (S230). The second boot loader 151a may load a kernel 161a into the external volatile memory device 130, and may verify a second message verification code 169a included in the kernel 161a using the unique key (S231). For example, a MAC verification code 154a included in the second execution image 152a may generate a message authentication code by executing a MAC algorithm on the unique key and a third execution image 162a included in the kernel 161a. The MAC verification code 154a may check confidentiality and integrity of the kernel 161 by comparing the generated message authentication code to the second message verification code 169a. If the generated message authentication code does not match the second message verification code 169a, the second message verification code 169a may be determined as invalid (S232: NO), and a boot operation of the system 100a may be terminated (S250).

If the generated message authentication code matches the second message verification code 169a, the second message verification code 169a may be determined as valid (S232: YES), and the second boot load 151a may verify a third digital signature 168a included in the kernel 161a using the public key (S233). For example, a signature verification code 153a included in the second execution image 152a may check integrity of the third execution image 162a by executing a signature verification algorithm on the public key, the third execution image 162a and the third digital signature 168a. If the third execution image 162a or the third digital signature 168a is changed, the third digital signature 168a may be determined as invalid (S234: NO), and a boot operation of the system 100a may be terminated (S250).

If the third digital signature 168a is valid (S234: YES), the processor core 111 may execute the kernel 161a to operate the system 100a (S240). Accordingly, the secure boot operation may be completed, and the system 100a may operate.

As describe above, in a secure boot method according to an exemplary embodiment of the present disclosure, the first message authentication code 159a included in the second boot loader 151a and the second message authentication code 169a included in the kernel 161a may be verified using the unique key that is unique for each system. Accordingly, the secure boot method may prevent the system 100a from being booted by an unauthenticated boot image or a cloned boot image.

Figure 3:
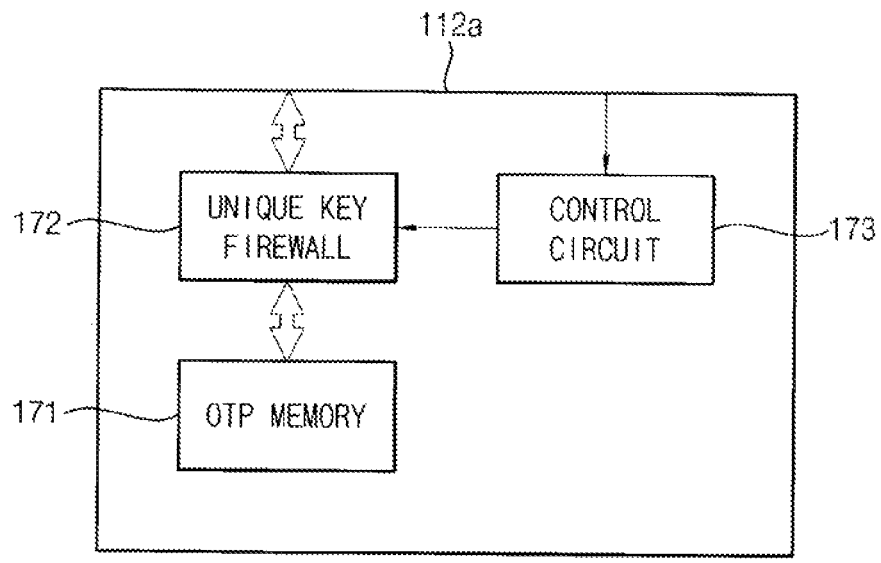
FIG. 3 is a diagram for describing an example of a method of protecting a private key included in a system of FIG. 1.

FIG. 3 is a diagram for describing an example of a method of protecting a private key included in a system of FIG. 1.

Referring to FIG. 3, a unique key storing unit 112a includes an OTP memory 171, a unique key firewall 172 and a control circuit 173.

The OTP memory 171 may store a unique key that is unique to the system or integrated circuit. That is, different systems have different unique keys. The unique key may be written to the OTP memory 171 when an integrated circuit 110 illustrated in FIG. 1 is manufactured. In some embodiments, the unique key storing unit 112a may include a mask ROM, a PROM, an EPROM, an EEPROM, a flash memory, etc. instead of the OTP memory 171.

The unique key firewall 172 may output the unique key stored in the OTP memory 171 during a secure boot operation, and may block an access to the OTP memory 171 after the secure boot operation. For example, a processor core 111 illustrated in FIG. 1 may read the unique key from the OTP memory 171 via the unique key firewall 172 during the secure boot operation. After the secure boot operation is completed, the processor core 111 may transmit a signal indicating that the secure boot operation is completed to the control circuit 173, and the control circuit 173 may control the unique key firewall 172 not to output the unique key.

As described above, since the unique key firewall 172 may make the OTP memory 171 inaccessible after the secure boot operation is completed, the unique key may be secured. Accordingly, access to the unique key and/or a boot image, such as by a hacking, may be blocked.

Figure 4:
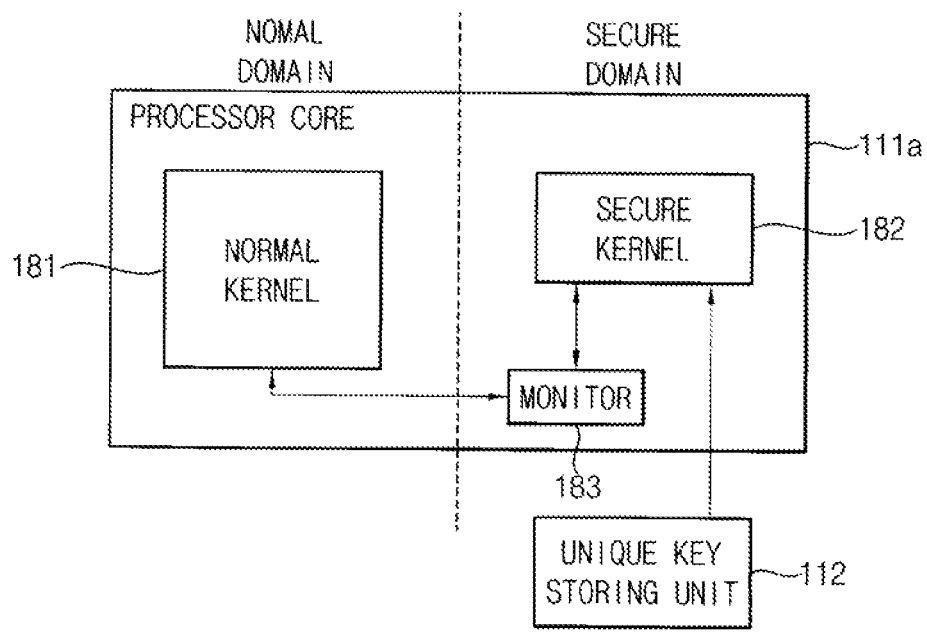
FIG. 4 is a diagram for describing another example of a method of protecting a private key included in a system of FIG. 1.

FIG. 4 is a diagram for describing another example of a method of protecting a private key included in a system of FIG. 1.

Referring to FIG. 4, a processor core 111a may execute a normal kernel 181 in a normal domain, and may execute a secure kernel 182 in a secure domain. A unique key storing unit 112 may be set as a secure peripheral device in the secure domain. An initial boot loader 121, a first boot loader 141a and a second boot loader 151a illustrated in FIG. 1 may be set to be executed in the secure domain, and at least a portion of a kernel 161a illustrated in FIG. 1 may be set to be executed in the normal domain. Accordingly, the unique key storing unit 112 may be accessed during a secure boot operation, and may not be accessed after the secure boot operation. Further, the processor core 111a may execute a monitor 183 for transferring data or a context between the normal domain and the secure domain. This security technique may be referred to as a "TRUSTZONE" technique, as to secure integrated circuits, microprocessors and microprocessor cores.

As described above, since the unique key storing unit 112 may be inaccessible after the secure boot operation is completed, the unique key may be secured.

Figure 5:
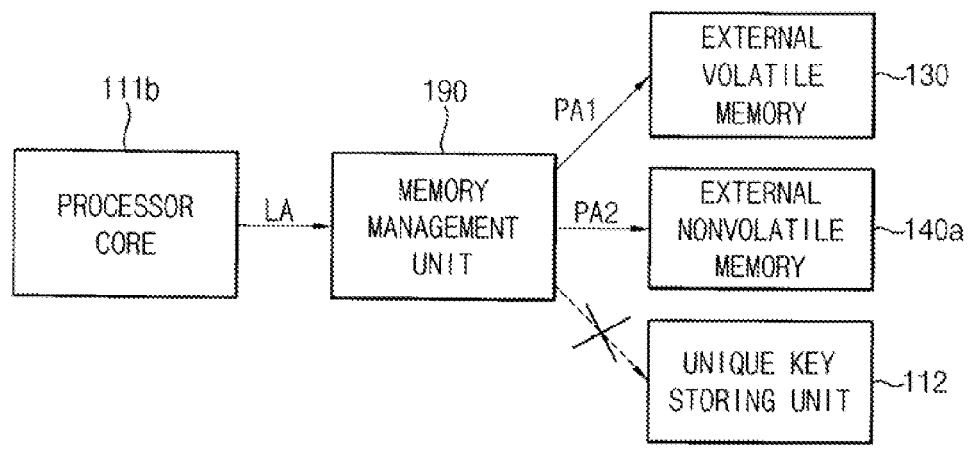
FIG. 5 is a diagram for describing still another example of a method of protecting a private key included in a system of FIG. 1.

FIG. 5 is a diagram for describing still another example of a method of protecting a private key included in a system of FIG. 1.

Referring to FIG. 5, a processor core 111b may access an external volatile memory device 130 and an external nonvolatile memory device 140a using a memory management unit (MMU) 190 included in a kernel after a secure boot operation is completed. The MMU 190 may convert a logical address LA provided from the processor core 111b into physical addresses PA1 and PA2 of the external volatile memory device 130 and the external nonvolatile memory device 140a, respectively. The MMU 190 may manage mapping information including the physical addresses PA1 and PA2 of the external volatile memory device 130 and the external nonvolatile memory device 140a. However, the mapping information managed by the MMU 190 may not include a physical address of a unique key storing unit 112, and thus the logical address LA provided from the processor core 111b may not be converted into the physical address of the unique key storing unit 112.

As described above, since the logical address LA may not be converted into the physical address of the unique key storing unit 112 after the secure boot operation is completed, the unique key storing unit 112 may not be accessed after the secure boot operation, and a unique key stored in the unique key storing unit 112 may be secured.

Figure 6:
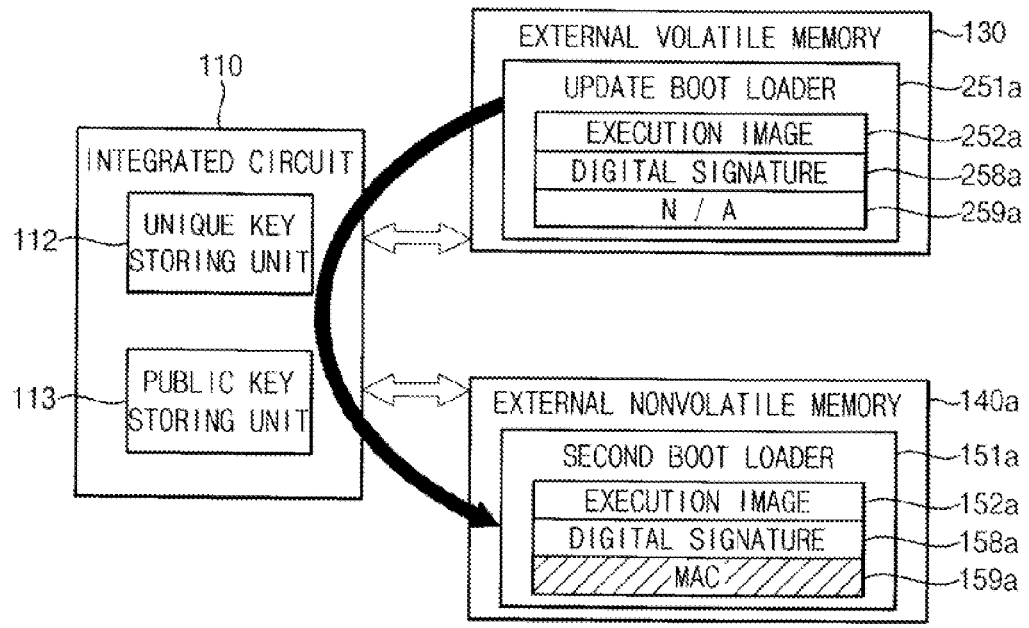
FIG. 6 is a block diagram for describing an example of a method of updating a boot image according to exemplary embodiments.

FIG. 6 is a block diagram for describing an example of a method of updating a boot image according to an exemplary embodiment of the present disclosure.

FIG. 6 illustrates an example where a second boot loader 151a is updated. Referring to FIG. 6, an update boot loader 251a may be downloaded from a host (not shown) into an external volatile memory device 130. For example, a system including an integrated circuit 110 may be coupled to the host through a universal serial bus (USB), and the update boot loader 251a may be written to the external volatile memory device 130 through the USB. In other examples, the update boot loader 251a may be wired or wirelessly downloaded from a remote host through an Ethernet, a mobile network (e.g., a 3G network), or the like.

The update boot loader 251a may include an execution image 252a and a digital signature 258a, and meaningless data 259a (e.g., data of which all values are "0") may be stored in a location to which a message authentication code 159a is to be written. The digital signature 258a included in the update boot loader 251a may be verified using a public key stored in a public key storing unit 113. If the digital signature 258a is valid, the update boot loader 251a stored in the external volatile memory device 130 may be written to an external nonvolatile memory device 140a. For example, the second boot loader 151a may be overwritten with the update boot loader 251a. After the update boot loader 251a is stored in the external nonvolatile memory device 140a, the message authentication code 159a may be generated using a unique key stored in a unique key storing unit 112 and the execution image 252a included in the update boot loader 251a. The generated message authentication code 159a may be written to the update boot loader 251a stored in the external nonvolatile memory device 140a, or the second boot loader 151a. Accordingly, a boot image having a message authentication code that is to be verified using a unique key may be updated.

According to exemplary embodiments, a boot image update operation may be performed by one of boot loaders during a secure boot operation, or may be performed by a kernel after the secure boot operation.

Figure 7:
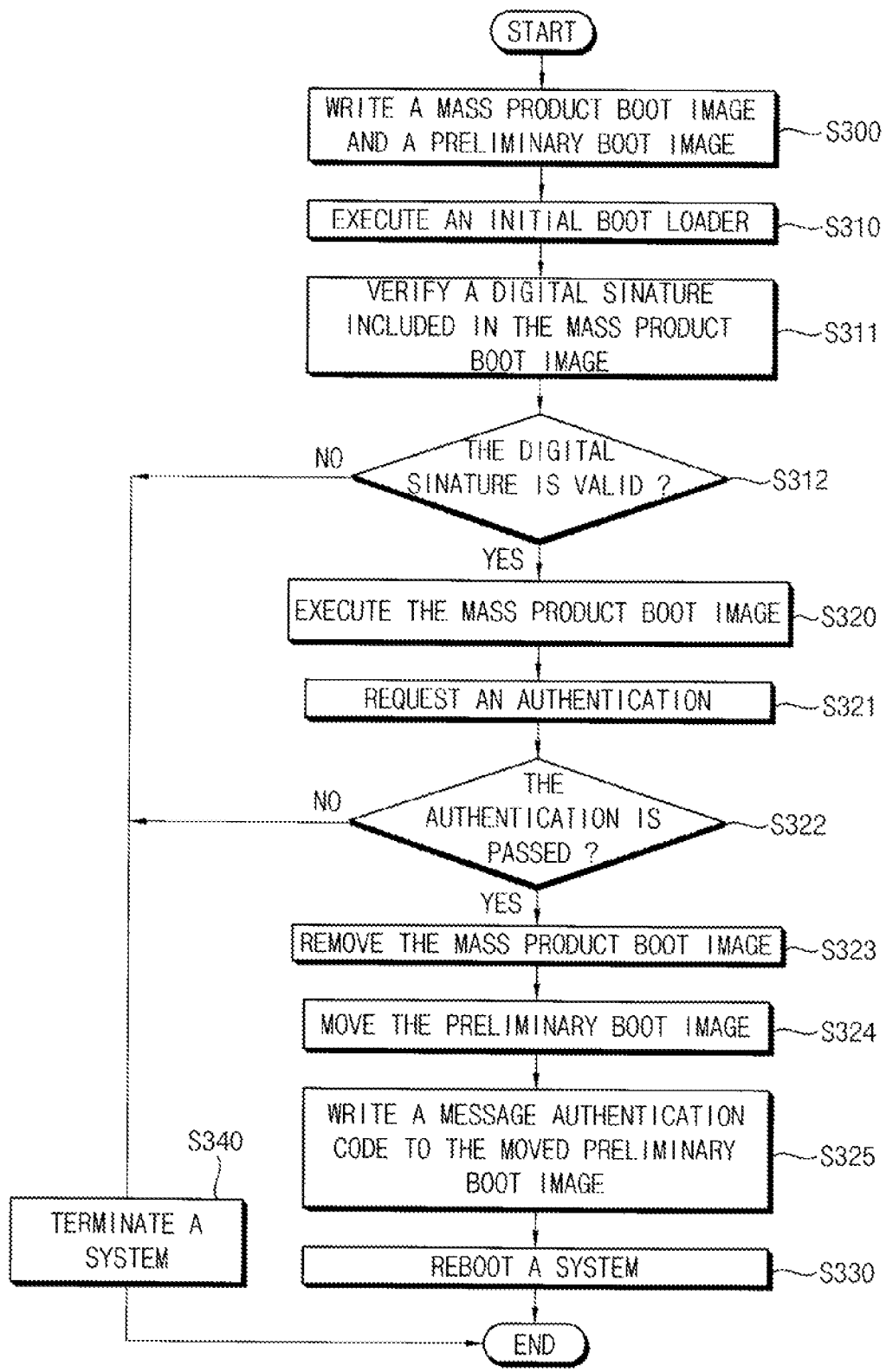
FIG. 7 is a flow chart illustrating a method of generating a secure boot image of a system performing a secure boot operation according to exemplary embodiments.
Figure 8:
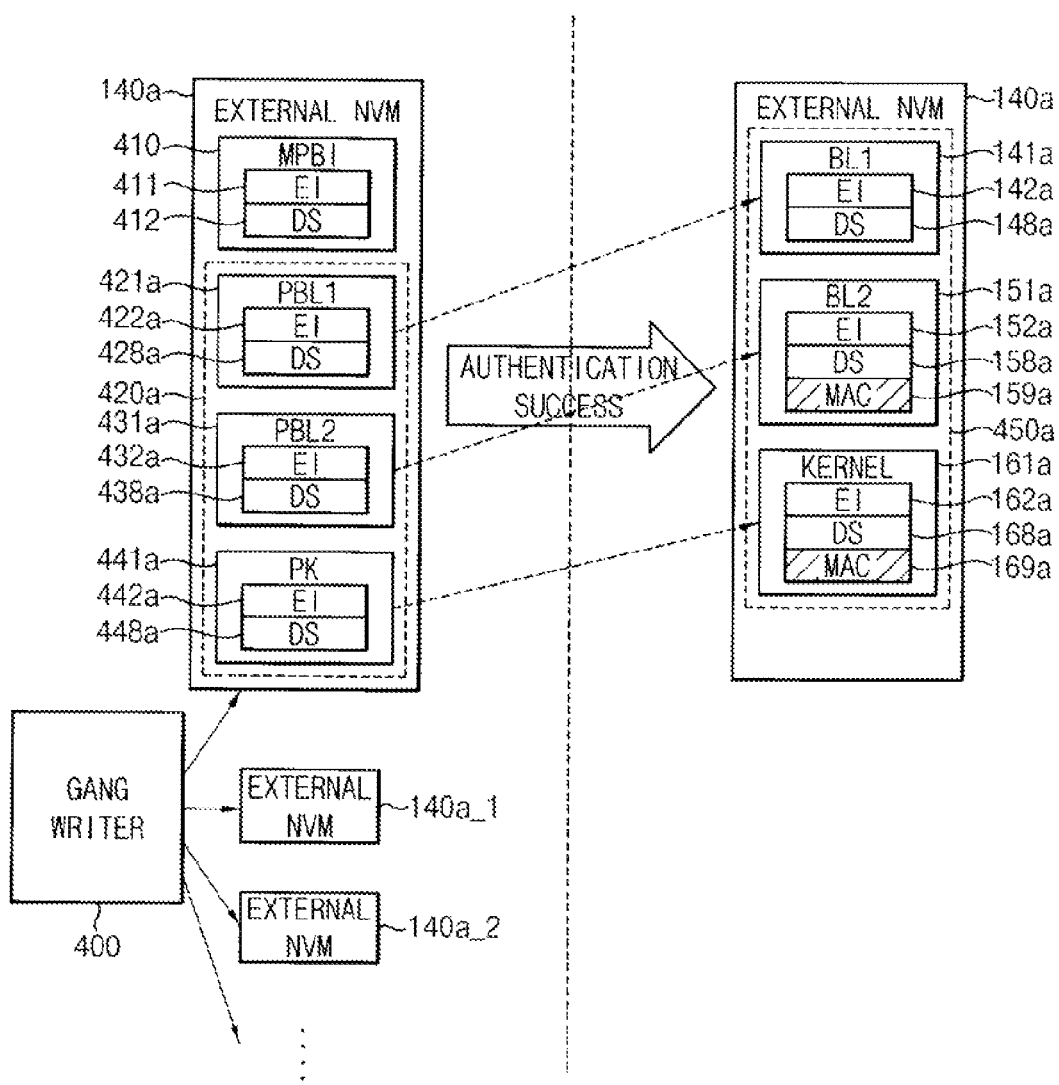
FIG. 8 is a diagram for describing a method of generating a secure boot image illustrated in FIG. 7.

FIG. 7 is a flow chart illustrating a method of generating a secure boot image of a system performing a secure boot operation according to exemplary embodiments, and FIG. 8 is a diagram for describing a method of generating a secure boot image illustrated in FIG. 7.

Referring to FIGS. 1, 7 and 8, a gang writer 400 may write substantially the same boot image 410 and substantially the same preliminary boot image 420a to a plurality of external nonvolatile memory devices 140a, 140a1 and 140a2 for a plurality of systems (S300). The boot image 410 may include an execution image 411 and a digital signature 412, and the preliminary boot image 420a may include a first preliminary boot loader 421a, a second preliminary boot loader 431a and a preliminary kernel 441a. The execution image 411 of the boot image 410 may include a code for removing the boot image 410 from the external nonvolatile memory device 140a, and a code for moving the first preliminary boot loader 421a, the second preliminary boot loader 431a and the preliminary kernel 441a to locations corresponding to a first boot loader 141a, a second boot loader 151a and a kernel 161a. The first preliminary boot loader 421a, the second preliminary boot loader 431a and the preliminary kernel 441a may include execution images 422a, 432a and 442a and digital signatures 428a, 438a and 448a, respectively.

When a system 100a is initially booted after the boot image 410 and the preliminary boot image 420a are written to the external nonvolatile memory device 140a, an initial boot loader 121 stored in an internal nonvolatile memory device 120 may be executed (S310). The initial boot loader 121 may load the boot image 410 from the external nonvolatile memory device 140a into an internal volatile memory device 116 or an external volatile memory device 130, and may verify the digital signature 412 included in the boot image 410 using a public key stored in a public key storing unit 113 (S311). If the digital signature 412 of the boot image 410 is invalid (S312: NO), and a boot operation of the system 100a may be terminated (S340).

If the digital signature 412 of the boot image 410 is valid (S312: YES), the boot image 410 may be executed (S320). The executed boot image 410 may request an authentication (S321). In some embodiments, the boot image 410 may receive a first password from a user, and may compare the first password to a second password included in the boot image 410. The boot image 410 may validate the authentication if the first password matches the second password. In other embodiments, the boot image 410 may request the authentication in a challenge-response manner. For example, the boot image 410 may generate an encrypted message by encrypting an original message using a public authentication key included in the boot image 410, and may provide the encrypted message to an external host (not shown). The host may generate a response message by decrypting the encrypted message using a private authentication key corresponding to the public authentication key, and may provide the response message to the system 100a. The boot image 410 may validate the authentication if the response message matches the original message. If the authentication is failed (S322: NO), and a boot operation of the system 100a may be terminated (S340).

If the authentication is passed (S322: YES), the execution image 411 of the loaded and executed boot image 410 may remove the boot image 410 from the external nonvolatile memory device 140a (S323), and may generate an execution boot image 450a by moving the first preliminary boot loader 421a, the second preliminary boot loader 431a and the preliminary kernel 441a to locations corresponding to the first boot loader 141a, the second boot loader 151a and the kernel 161a, respectively (S324). For example, the first preliminary boot loader 421a may be moved to a location corresponding to the first boot loader 141a (e.g., a location of the removed boot image 410), and thus the first preliminary boot loader 421a may be loaded and executed as the first boot loader 141a by the initial boot loader 121 during a next boot operation. The execution image 411 of the loaded and executed boot image 410 may write a first message authentication code 159a and a second message authentication code 169a to the moved second preliminary boot loader 431a (i.e., the second boot loader 151a) and the moved preliminary kernel 441a (i.e., the kernel 161a) (S325). For example, the execution image 411 of the boot image 410 may generate the first message authentication code 159a using a unique key stored in a unique key storing unit 112 and the execution image 432a of the moved second preliminary boot loader 431a, and may write the generated first message authentication code 159a to the moved second preliminary boot loader 431a. Further, the execution image 411 of the boot image 410 may generate the second message authentication code 169a using the unique key and the execution image 442a of the moved preliminary kernel 441a, and may write the generated second message authentication code 169a to the moved preliminary kernel 441a.

After the execution boot image 450a including the first and second message authentication codes 159a and 169a is generated, the system 100a may be rebooted (S330). A secure boot method according to an exemplary embodiment of the present disclosure may be performed while the system 100a is rebooted.

As described above, although substantially the same boot image 410 and substantially the same preliminary boot image 420a are written to the plurality of external nonvolatile memory devices 140a, 140a_1 and 140a_2 for the plurality of systems, the execution boot image 450a may be generated including unique message authentication code 159a and 169a for each system. Accordingly, the system performing a secure boot operation may be readily mass-produced.

Figure 9:
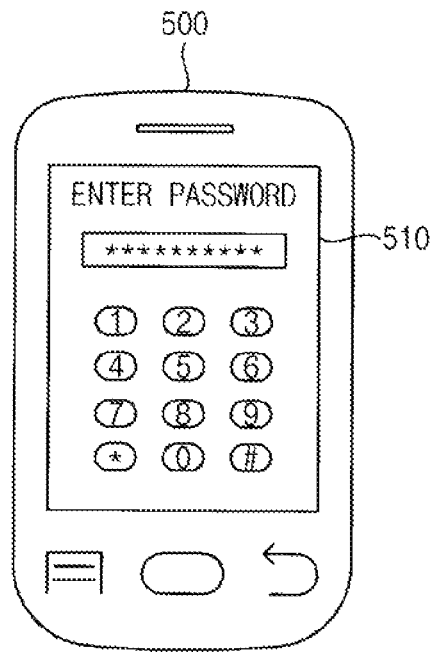
FIG. 9 is a diagram for describing an example of an authentication step in a method of generating a secure boot image illustrated in FIG. 7.

FIG. 9 is a diagram for describing an example of an authentication step in a method of generating a secure boot image illustrated in FIG. 7.

Referring to FIG. 9, a system 500, such as a mobile phone, may receive a password from a user via an input device 510, such as a key pad, a touch screen, voice control means, etc. For example, a manufacturer of the system 500 may input the password after the system 500 is manufactured. A mass-produced boot image of the system 500 may include a code for initializing the input device 510, and the mass-produced boot image may be executed when the system 500 is initially booted after the system 500 is manufactured. A mass-produced boot image according to an embodiment of the present disclosure is a boot image created for more than one system. That is the boot image may be embodied in more then one system.

The system 500 may compare the received password to a password included in the mass-produced boot image, and may generate an execution boot image in case of a match of the passwords. Accordingly, even if the mass-produced boot image is exposed to a hacker, the execution boot image may be prevented from being generated by the hacker. Thus, an image rollback attack or a device cloning attack may be blocked.

Figure 10:
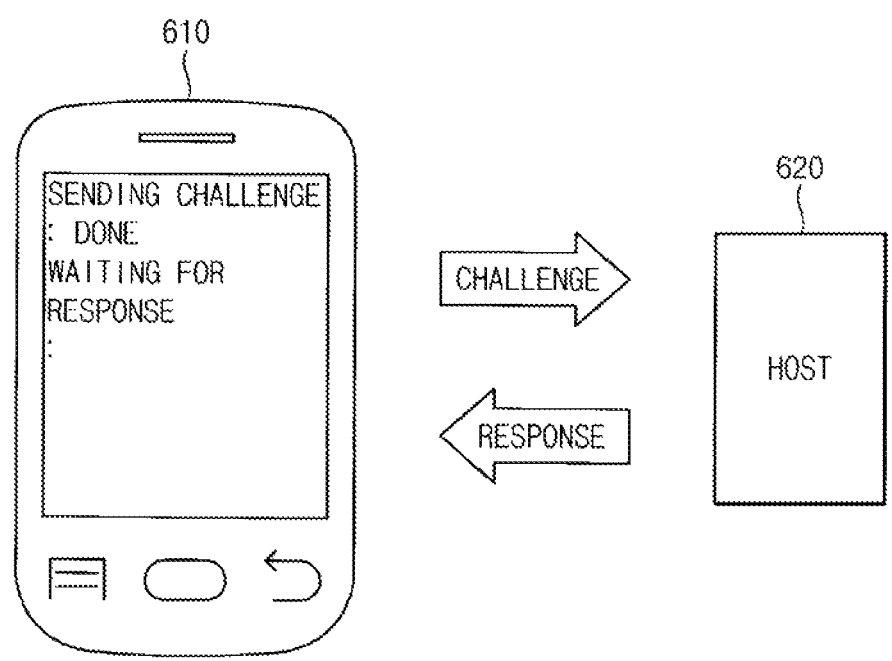
FIG. 10 is a diagram for describing another example of an authentication step in a method of generating a secure boot image illustrated in FIG. 7.

FIG. 10 is a diagram for describing another example of an authentication step in a method of generating a secure boot image illustrated in FIG. 7.

Referring to FIG. 10, a system 610, such as a mobile phone, may request an authentication in a challenge-response manner. For example, a boot image of the system 610 may generate an encrypted message by encrypting an original message using a public authentication key included in the boot image, and may provide the encrypted message to an external host 620. The external host 620 may generate a response message by decrypting the encrypted message using a private authentication key corresponding to the public authentication key, and may provide the response message to the system 610. The boot image of the system 610 may compare the response message to the original message, and may validate the authentication in case of a match of the response message and the original message. In some embodiments, the encrypted message may include a data structure for checking validity of the encrypted message, and the external host 620 may generate the response message only if the encrypted message is valid.

For example, after the system 610 is manufactured, a manufacturer of the system 610 may connect the system 610 to the external host 620, such as a computer storing the private authentication key, through a USB to perform the authentication. In other examples, the manufactured system 610 may be provided to a customer, and the system 610 may display the encrypted message. To perform the authentication, the customer may inform the manufacturer of the displayed message, and the manufacturer may inform the customer of the response message corresponding to the displayed message. In still other examples, when the system 610 is initially booted after the system 610 is provided to a customer, the system 610 may be connected to the external host 650 through an Ethernet, a mobile network (e.g., a 3G network), or the like, to perform the authentication.

Figure 11:
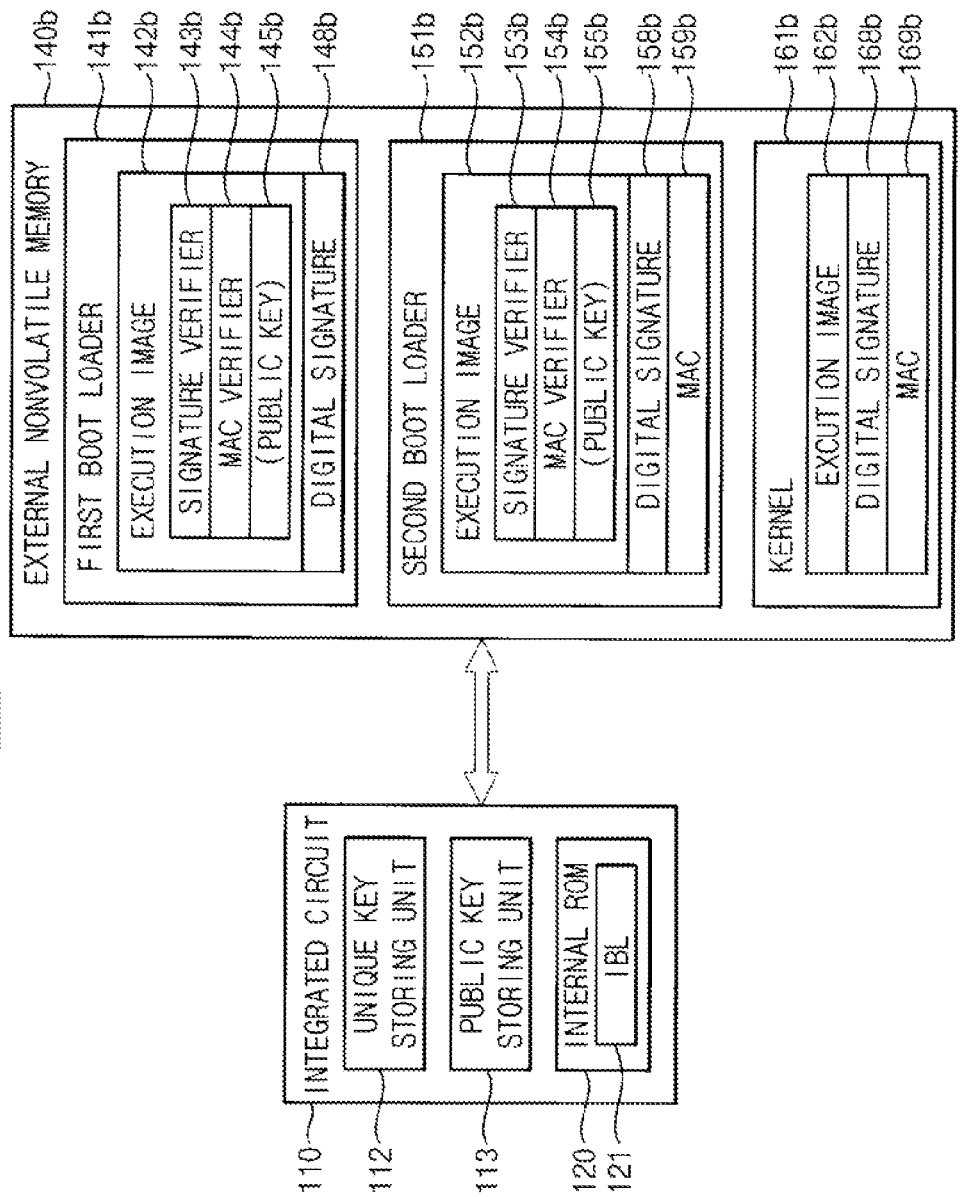
FIG. 11 is a block diagram illustrating a system performing a secure boot operation according to exemplary embodiments.
Figure 12A:
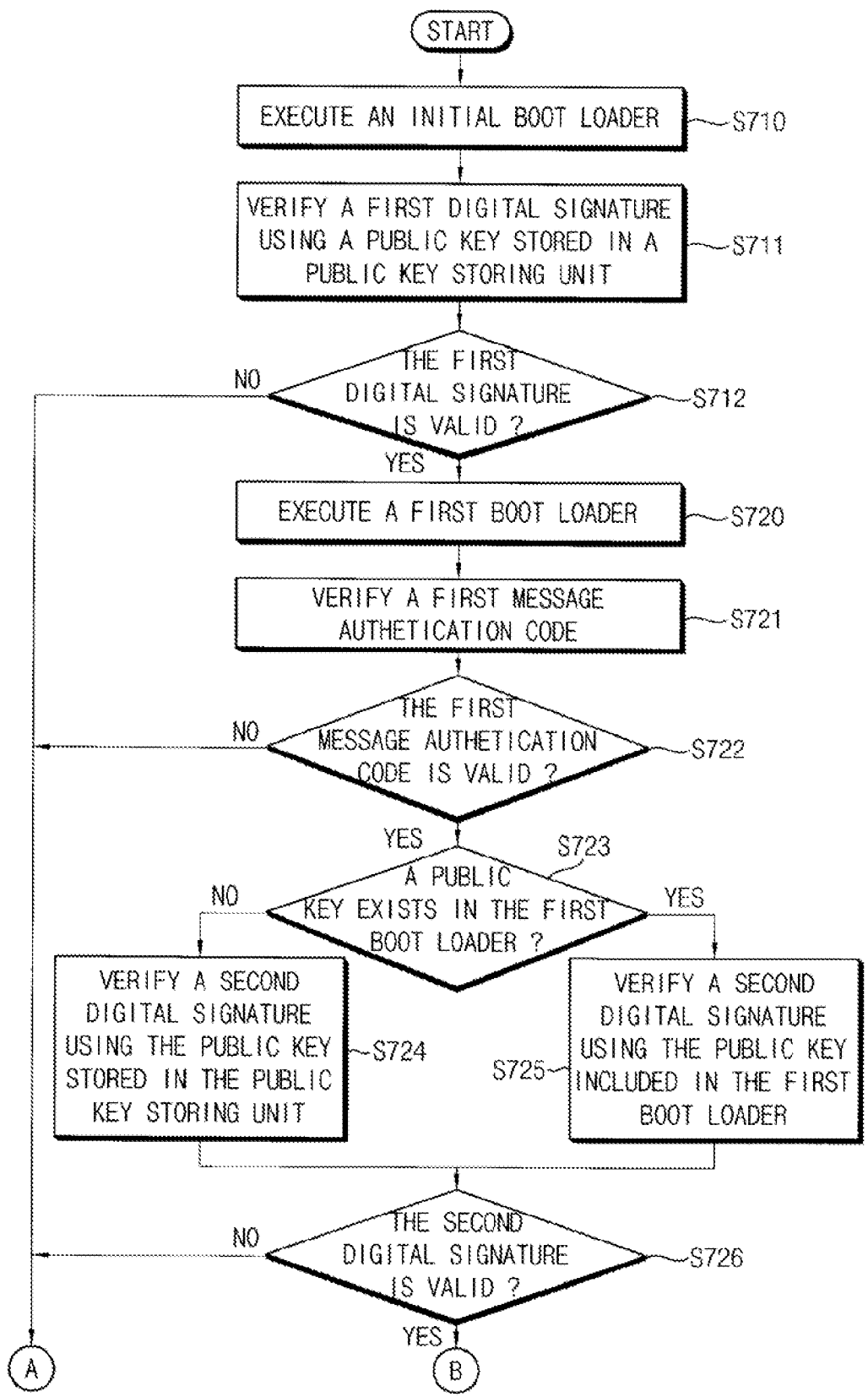
FIGS. 12A and 12B are flow charts illustrating a secure boot method according to exemplary embodiments.
Figure 12B:
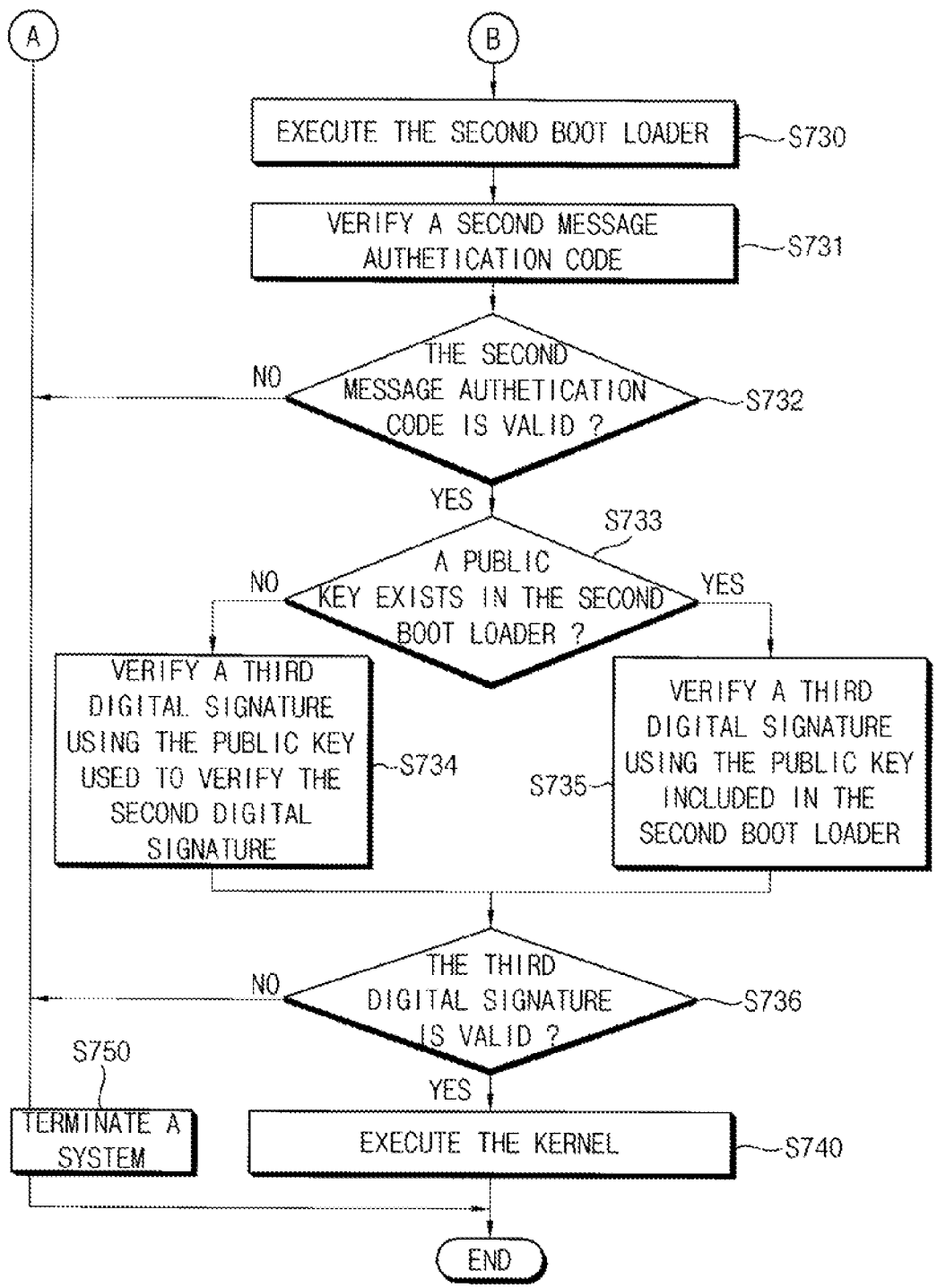

FIG. 11 is a flow chart illustrating a method of generating a secure boot image of a system performing a secure boot operation according to exemplary embodiments, and FIGS. 12A and 12B are flow charts illustrating a method of generating a secure boot image of a system performing a secure boot operation according to exemplary embodiments.

Referring to FIGS. 11, 12A and 12B, a system 100b includes an integrated circuit 110 and an external nonvolatile memory device 140b. The first and second boot loaders 141b and 151b illustrated in FIG. 11 may include public keys 145b and 155b.

In a secure boot method, an initial boot loader 121 stored in an internal nonvolatile memory device 120 may be executed (S710). The initial boot loader 121 may load the first boot loader 141b stored in the external nonvolatile memory device 140b, and may verify a first digital signature 148b included in the first boot loader 141b using a public key stored in a public key storing unit 113 (S711). If the first digital signature 148b is invalid (S712: NO), and a boot operation of the system 100b may be terminated (S750).

If the first digital signature 148b is valid (S712: YES), the first boot loader 141b may be executed (S720). A first execution image 142b of the first boot loader 141b may load a second boot loader 151b, and a MAC verification code 144b of the first execution image 142b may verify a first message authentication code 159b included in the second boot loader 151b using a unique key stored in a unique key storing unit 112 (S721). If the first message authentication code 159b is invalid (S722: NO), and a boot operation of the system 100b may be terminated (S750).

If the first message authentication code 159b is valid (S722: YES), a signature verification code 143b of the first execution image 142b may verify a second digital signature 158b included in the second boot loader 151b by selectively using a public key 145b included in the first boot loader 141b or the public key stored in the public key storing unit 113 depending on whether first boot loader 141b includes the public key 145b. If the public key 145b does not exist in the first boot loader 141b (e.g., in a case where values of "0" are written to a public key region of the first boot loader 141b) (S723: NO), the second digital signature 158b may be verified using the public key stored in the public key storing unit 113 (S724). If the public key 145b exists in the first boot loader 141b (S723: YES), the second digital signature 158b may be verified using the public key 145b included in the first boot loader 141b (S725). If the second digital signature 158b is invalid (S726: NO), and a boot operation of the system 100b may be terminated (S750).

If the second digital signature 158b is valid (S726: YES), the second boot loader 151b may be executed (S730). A second execution image 152b of the second boot loader 151b may load a kernel 161b, and a MAC verification code 154b of the second execution image 152b may verify a second message authentication code 169b included in the kernel 161b using the unique key (S731). If the second message authentication code 169b is invalid (S732: NO), and a boot operation of the system 100b may be terminated (S750).

If the second message authentication code 169b is valid (S732: YES), and a public key 155b does not exist in the second boot loader 151b (S733: NO), a signature verification code 153b of the second execution image 152b may verify a third digital signature 168b of the kernel 161b using a public key that is used to verify the second digital signature 158b (S734). For example, in a case where the second digital signature 158b is verified using the public key 145b included in the first boot loader 141b, the third digital signature 168b may be also verified using the public key 145b included in the first boot loader 141b. In a case where the second digital signature 158b is verified using the public key stored in the public key storing unit 113, the third digital signature 168b may be also verified using the public key stored in the public key storing unit 113.

If the second message authentication code 169b is valid (S732: YES), and the public key 155b exists in the second boot loader 151b (S733: YES), the signature verification code 153b of the second execution image 152b may verify the third execution image 162b and the third digital signature 168b of the kernel 161b using the public key 155b included in the second boot loader 151b (S735). If the third execution image 162b or the third digital signature 168b is changed, the third digital signature 168b may be determined as invalid (S736: NO), and a boot operation of the system 100b may be terminated (S750).

If the third digital signature 168b is valid (S736: YES), a third execution code 161b of the kernel 161b may be executed (S740). Thus, a secure boot operation may be completed, and the system 100b may normally operate.

As described above, in a secure boot method according to exemplary embodiments, the message authentication code 159b and 169 may be verified using the unique key that is unique to the system, and thus the system 100b may be prevented from being booted by an unauthenticated boot image or a cloned boot image. Further, in the secure boot method according to exemplary embodiments, the public key 145b and 155b included in the boot loader 141b and 151b or the public key stored in the public key storing unit 113 may be selectively used depending on whether the public key 145b and 155b exists in the boot loader 141b and 151b, and thus the public key may be readily and securely updated.

Figure 13:
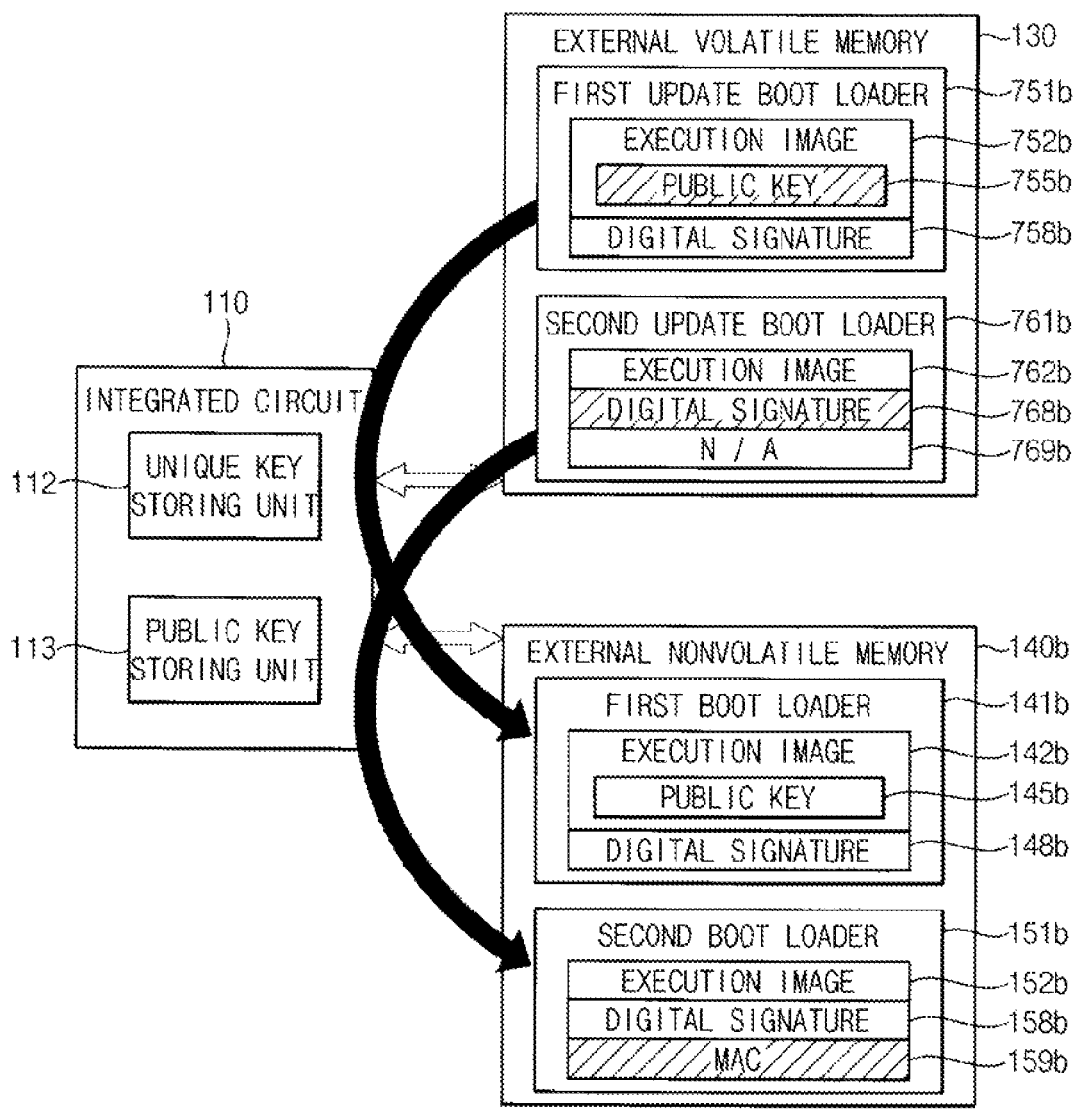
FIG. 13 is a block diagram for describing an example of a method of updating a boot image according to exemplary embodiments.

FIG. 13 is a block diagram for describing an example of a method of updating a boot image according to exemplary embodiments.

FIG. 13 illustrates an example where first and second boot loaders 141b and 151b are updated, and a public key 145b for verifying a digital signature 158b of the second boot loader 151b is updated. Referring to FIG. 13, a first update boot loader 751b and a second update boot loader 761b may be downloaded from a host (not shown) into an external volatile memory device 130. For example, the first and second update boot loaders 751b and 761b may be downloaded through a USB, an Ethernet, a mobile network, etc.

The first update boot loader 751a may include an execution image 752b, an update public key 755b and a digital signature 758b, and the second update boot loader 761b may include an execution image 762b, and an update digital signature 768b. In the second update boot loader 761b, meaningless data 769b may be stored in a location to which a message authentication code 159b is to be written. The digital signature 758a included in the first update boot loader 751b may be verified using a public key stored in a public key storing unit 113. If the digital signature 758a is valid, the first boot loader 141b may be overwritten with the first update boot loader 751b.

The update digital signature 768b included in the second update boot loader 761b may be verified using the update public key 755b of the first update boot loader 751b. If the update digital signature 768b is valid, the second boot loader 151b may be overwritten with the second update boot loader 761b. After the second update boot loader 761b is stored in an external nonvolatile memory device 140b, the message authentication code 159b may be generated using a unique key stored in a unique key storing unit 112 and the execution image 762b included in the second update boot loader 761b. The generated message authentication code 159b may be written to the second update boot loader 761b stored in the external nonvolatile memory device 140b, or the second boot loader 151b. Accordingly, a boot image having a message authentication code that is to be verified using a unique key may be updated. Further, the public key 145b and the digital signature 158b may be readily and securely updated.

Figure 14:
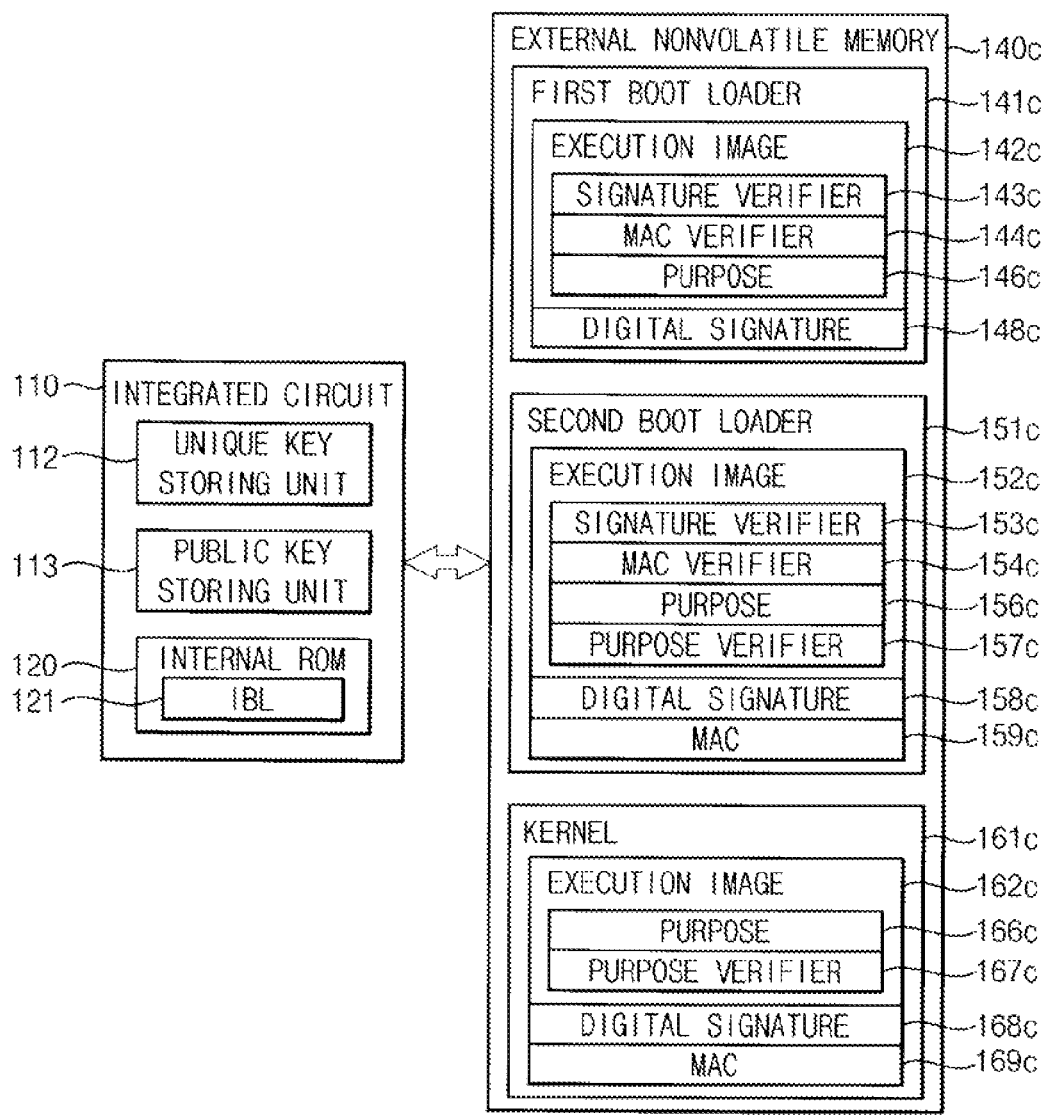
FIG. 14 is a block diagram illustrating a system performing a secure boot operation according to exemplary embodiments.
Figure 15A:
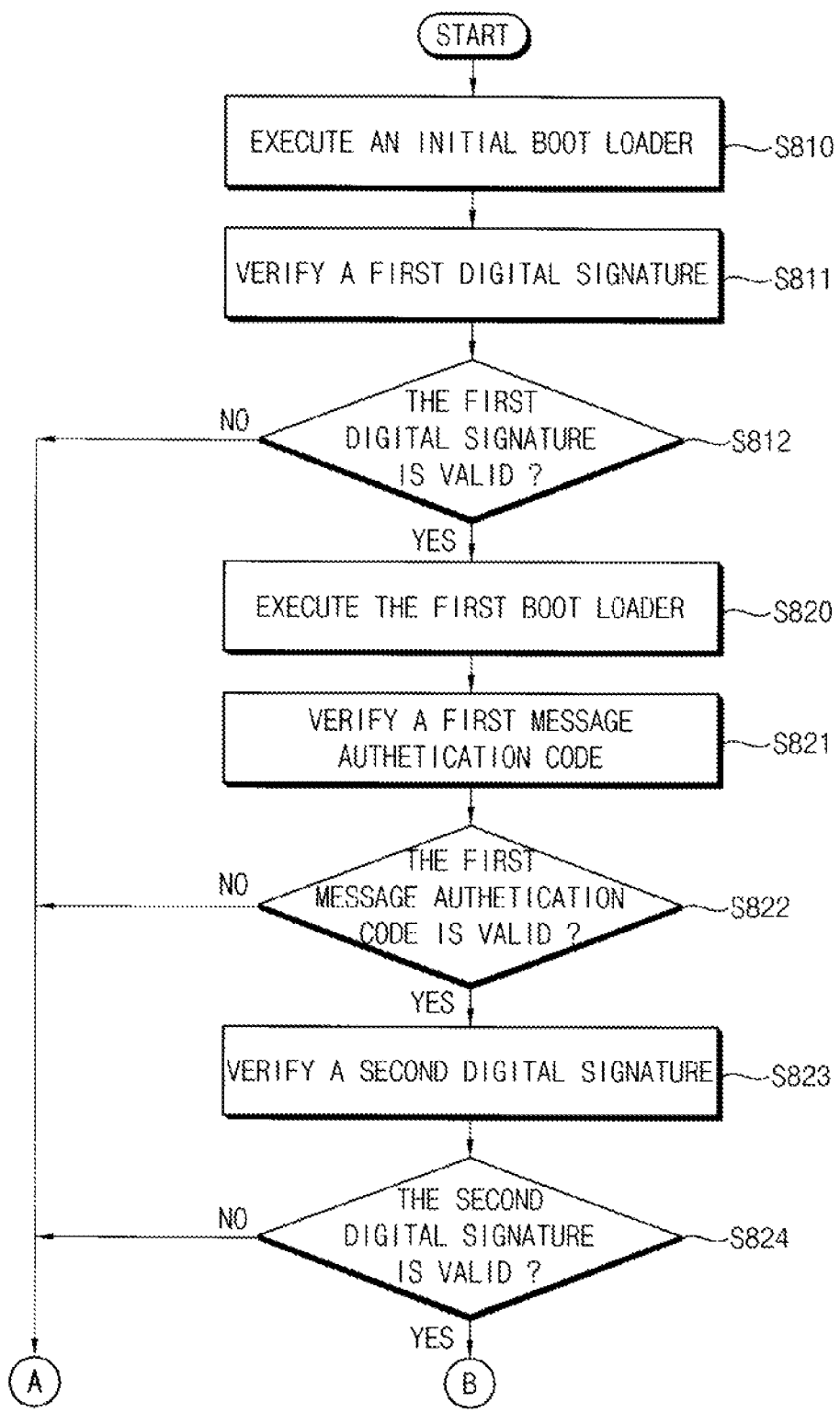
FIGS. 15A and 15B are flow charts illustrating a method of generating a secure boot image of a system performing a secure boot operation according to exemplary embodiments.
Figure 15B:
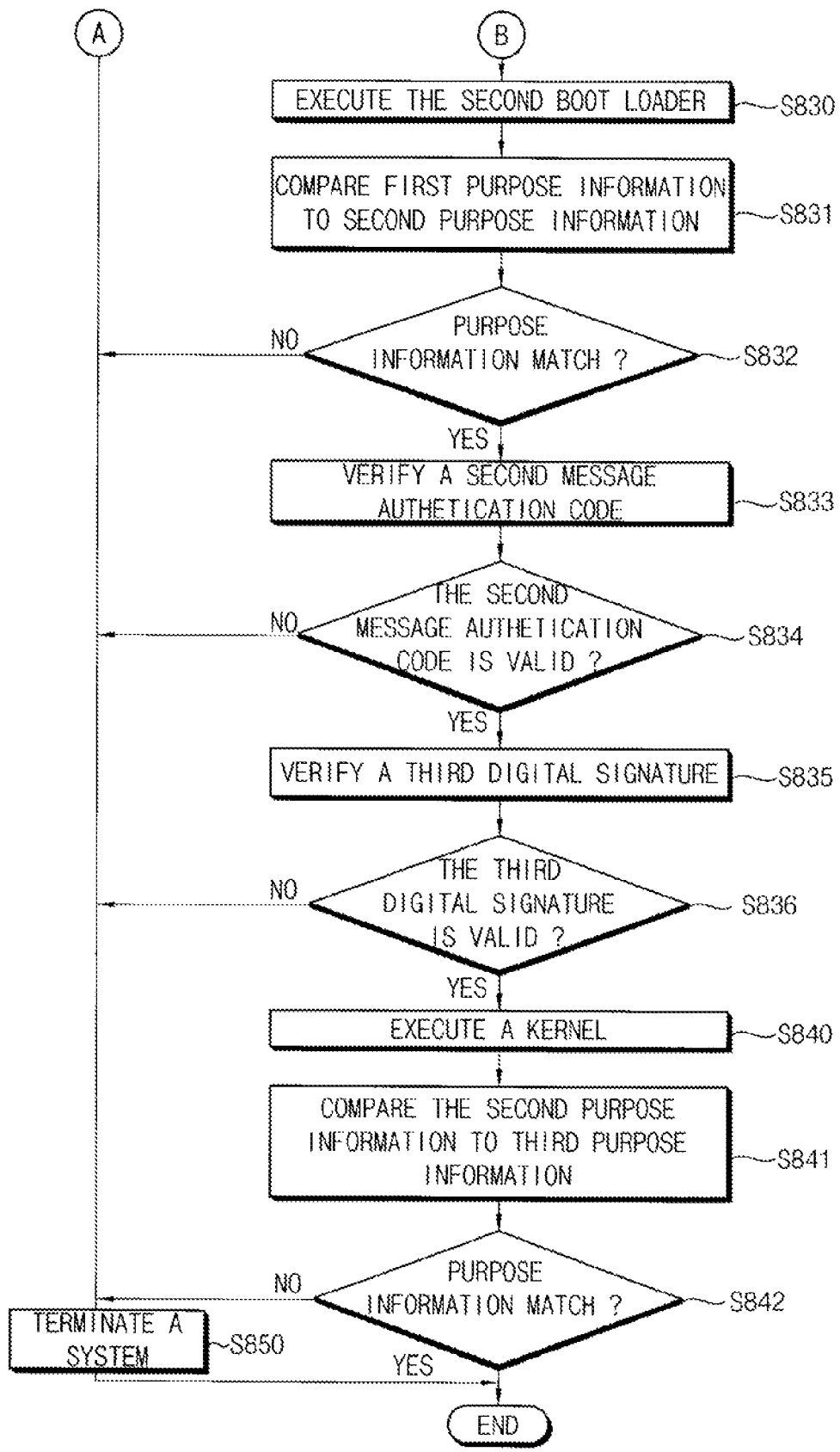

FIG. 14 is a block diagram illustrating a system performing a secure boot operation according to exemplary embodiments, and FIGS. 15A and 15B are flow charts illustrating a method of generating a secure boot image of a system performing a secure boot operation according to exemplary embodiments.

Referring to FIGS. 14, 15A and 15B, a system 100c includes an integrated circuit 110 and an external nonvolatile memory device 140c. A boot image illustrated in FIG. 14 may include purpose information 146c, 156c and 166c and purpose verification codes 157c and 167c.

In a secure boot method, an initial boot loader 121 stored in an internal nonvolatile memory device 120 may be executed (S810). The initial boot loader 121 may load the first boot loader 141c stored in the external nonvolatile memory device 140c, and may verify a first digital signature 148c included in the first boot loader 141c using a public key stored in a public key storing unit 113 (S811). If the first digital signature 148c is invalid (S812: NO), and a boot operation of the system 100c may be terminated (S850).

If the first digital signature 148c is valid (S812: YES), the first boot loader 141c may be executed (S820). A first execution image 142c of the first boot loader 141c may load a second boot loader 151c, and a MAC verification code 144c of the first execution image 142c may verify a first message authentication code 159c included in the second boot loader 151c using a unique key stored in a unique key storing unit 112 (S821). If the first message authentication code 159c is invalid (S822: NO), and a boot operation of the system 100c may be terminated (S750). If the first message authentication code 159c is valid (S822: YES), a signature verification code 143c of the first execution image 142c may verify a second digital signature 158c included in the second boot loader 151c using the public key (S823). If the second digital signature 158c is invalid (S824: NO), and a boot operation of the system 100c may be terminated (S850).

If the second digital signature 158c is valid (S824: YES), the second boot loader 151c may be executed (S830). A purpose verification code 157c of a second execution image 152c may compare first purpose information 146c included in the first boot loader 141c to second purpose information 156c included in the second boot loader 151c (S831). For example, each of the purpose information 146c, 156c and 166c may indicate that a corresponding boot loader 141c and 151c or kernel 161c has one of a development purpose, a mass product purpose and an execution purpose. The purpose verification code 157c may be referred to as a "purpose verifier." If the first purpose information 146c does not match the second purpose information 156c (S832: NO), and a boot operation of the system 100c may be terminated (S850).

If the first purpose information 146c matches the second purpose information 156c (S832: YES), the second execution image 152c of the second boot loader 151c may load a kernel 161c, and a MAC verification code 154c of the second execution image 152c may verify a second message authentication code 169c included in the kernel 161c using the unique key (S833). If the second message authentication code 169c is invalid (S834: NO), and a boot operation of the system 100c may be terminated (S750). If the second message authentication code 169c is valid (S834: YES), a signature verification code 153c of the second execution image 152c may verify a third digital signature 168c of the kernel 161c using the public key (S835). If the third digital signature 168c is invalid (S836: NO), and a boot operation of the system 100c may be terminated (S750).

If the third digital signature 168b is valid (S836: YES), the kernel 161c may be executed (S840). A purpose verification code 167c of a third execution image 162c may compare the second purpose information 156c included in the second boot loader 151c to third purpose information 166c included in the kernel 161c (S841). If the second purpose information 156c does not match the third purpose information 166c (S842: NO), and a boot operation of the system 100c may be terminated (S850). If the second purpose information 156c matches the third purpose information 166c (S842: YES), a secure boot operation may be completed, and the system 100a may normally operate.

As described above, in a secure boot method according to an exemplary embodiment of the present disclosure, the message authentication code 159c and 169c may be verified using the unique key that is unique for each system, and thus the system 100c may be prevented from being booted by an unauthenticated boot image or a cloned boot image. Further, in the secure boot method according to an exemplary embodiment of the present disclosure, the secure boot operation may be normally completed in case of a match of the purpose information 146c, 156c and 166c. Accordingly, even if a boot image for the development or the boot image is exposed to a hacker, the system 100c may be prevented from being booted by the exposed boot image.

Figure 16:
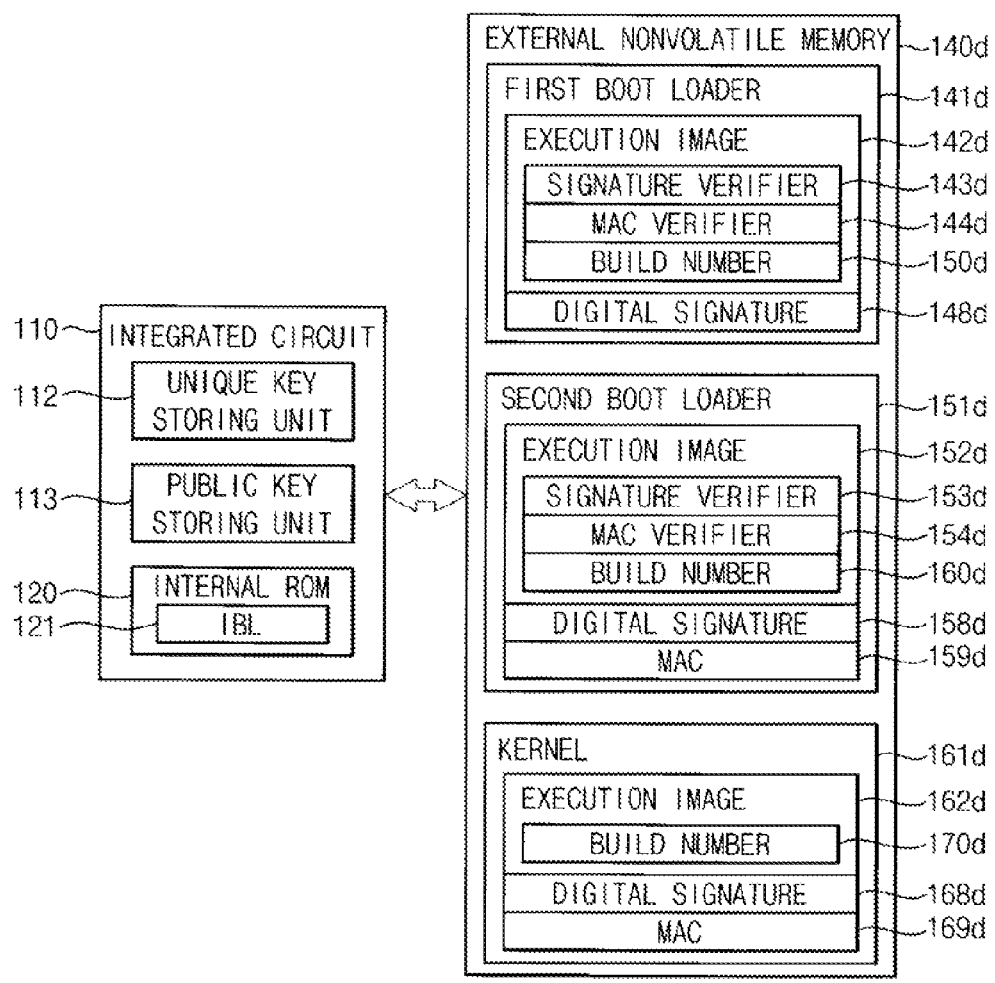
FIG. 16 is a block diagram illustrating a system performing a secure boot operation according to exemplary embodiments.

FIG. 16 is a block diagram illustrating a system performing a secure boot operation according to an exemplary embodiment of the present disclosure.

Referring to FIG. 16, a system 100d includes an integrated circuit 110 and an external nonvolatile memory device 140d. A boot image illustrated in FIG. 16 may include build numbers 150d, 160d and 170d.

A first boot loader 141d may include a first execution image 142d and a first digital signature 148d, and the first execution image 142d may include a signature verification code 143d, a MAC verification code 144d and a first build number 150d representing version information of the first boot loader 141d. A second boot loader 151d may include a second execution image 152d, a second digital signature 158d and a first message authentication code 159d, and the second execution image 152d may include a signature verification code 153d, a MAC verification code 154d and a second build number 160d representing version information of the second boot loader 151d. A kernel 161d may include a third execution image 162d, a third digital signature 168d and a second message authentication code 169d, and the third execution image 162d may include a third build number 170d representing version information of the kernel 170d.

In the system 100d according to an exemplary embodiment of the present disclosure, the first boot loader 141d, the second boot loader 151d and the kernel 161d may be updated using the first build number 150d, the second build number 160d and the third build number 170d, respectively. Accordingly, a boot image may be prevented from being updated from a newer version to an older version.

Figure 17:
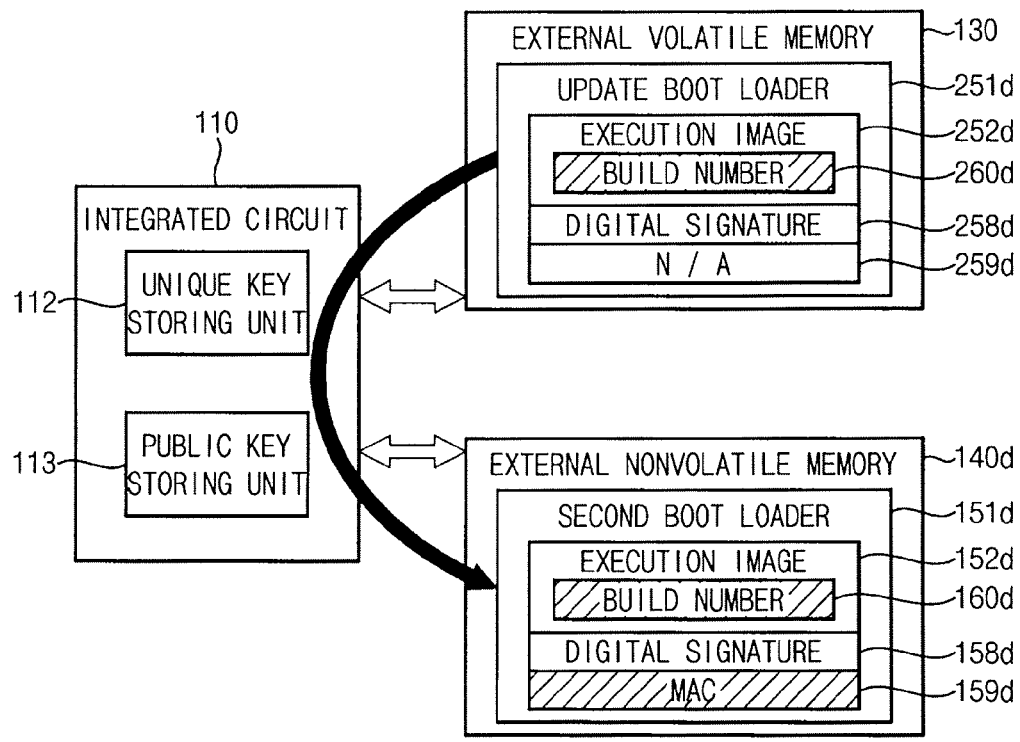
FIG. 17 is a block diagram for describing an example of a method of updating a boot image according to exemplary embodiments.

FIG. 17 is a block diagram for describing an example of a method of updating a boot image according to an exemplary embodiment of the present disclosure.

FIG. 17 illustrates an example where a second boot loader 151d is updated. Referring to FIG. 17, an update boot loader 251d may be downloaded from a host (not shown) into an external volatile memory device 130. For example, the update boot loader 251d may be downloaded through a USB, an Ethernet, a mobile network, etc.

The update boot loader 251d may include an execution image 252d, a build number 260d representing version information of the update boot loader 251 d, and a digital signature 258d. In the update boot loader 251d, meaningless data 259d may be stored in a location to which a message authentication code 159d is to be written. The digital signature 258d included in the update boot loader 251d may be verified using a public key stored in a public key storing unit 113. If the digital signature 258a is valid, the build number 260d of the update boot loader 251 d may be compared to a build number 160d of the second boot loader 151d stored in the external nonvolatile memory device 140d. If the build number 260d of the update boot loader 251 d is higher than the build number 160d of the second boot loader 151d, the second boot loader 151d may be overwritten with the update boot loader 251d. After the update boot loader 251d is stored in the external nonvolatile memory device 140d, the message authentication code 159d may be generated using a unique key stored in a unique key storing unit 112 and the execution image 252d included in the update boot loader 251d, and may be written to the update boot loader 251d stored in the external nonvolatile memory device 140d, or the second boot loader 151d. Accordingly, a boot image may be readily and securely updated using version information.

Figure 18:
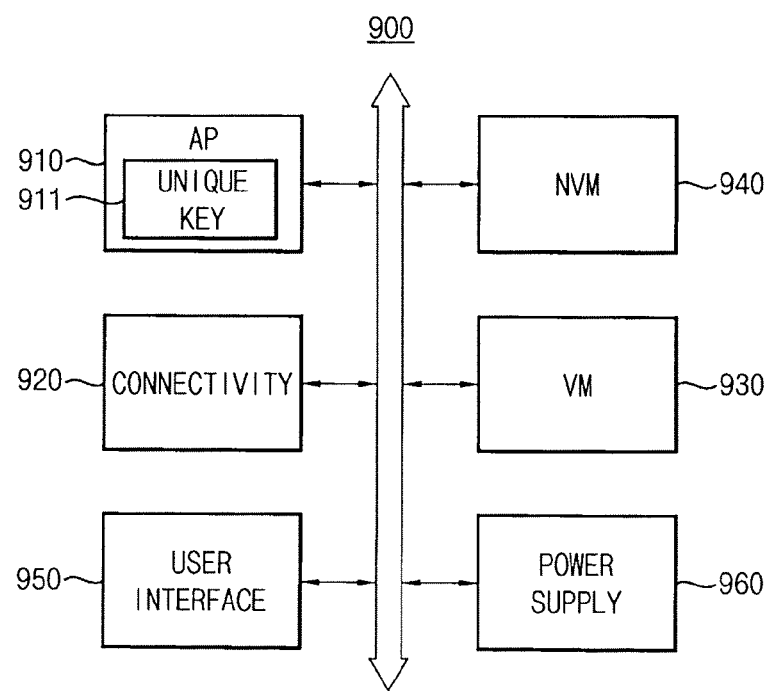
FIG. 18 is a block diagram illustrating a mobile system according to exemplary embodiments.

FIG. 18 is a block diagram illustrating a mobile system according to an exemplary embodiment of the present disclosure.

Referring to FIG. 18, a mobile system 900 includes an application processor 910, a connectivity unit 920, a volatile memory device 930, a nonvolatile memory device 940, a user interface 950 and a power supply 960. According to an exemplary embodiment of the present disclosure, the mobile system 900 may be any mobile system, such as a mobile phone, a smart phone, a personal digital assistant (PDA), a portable multimedia player (PMP), a digital camera, a portable game console, a music player, a camcorder, a video player, a navigation system, etc.

The application processor 910 may execute applications, such as an Internet browser, a game application, a video player application, etc. The application processor 910 may store a unique key 911 that is unique for each mobile system. When the application processor 910 executes a boot image stored in the nonvolatile memory device 940, the application processor 910 may verify a message authentication code included in the boot image using the unique key 911. Accordingly, confidentiality and integrity of the boot image may be maintained, and the mobile system 900 may perform a secure boot operation using an authenticated boot image. According to exemplary embodiments of the present disclosure, the application processor 910 may be coupled to an internal/external cache memory.

The connectivity unit 920 may communicate with an external device. For example, the connectivity unit 920 may perform a USB communication, an Ethernet communication, a near field communication (NFC), a radio frequency identification (RFID) communication, a mobile telecommunication, a memory card communication, etc.

The volatile memory device 930 may store data processed by the application processor 910, or may serve as a working memory. For example, the volatile memory device 930 may be implemented by a DRAM, a SRAM, a mobile DRAM, or the like.

The nonvolatile memory device 940 may store the boot image for booting the mobile system 900. The boot image may include the message authentication code as well as a digital signature. The digital signature may be verified using a public key, and the message authentication code may be verified using the unique key 911. According to exemplary embodiments, the boot image may further include an update public key for updating the public key, purpose information for preventing the mobile system 900 from being booted by a leaked boot image for development or mass product, and/or a build number for preventing the boot image from being updated to an older boot image. For example, the nonvolatile memory device 940 may be implemented by an EEPROM, a flash memory, a PRAM, a RRAM, a NFGM, a PoRAM, a MRAM, a FRAM, or the like.

The user interface 950 may include at least one input device, such as a keypad, a touch screen, etc., and at least one output device, such as a display device, a speaker, etc. The power supply 960 may supply the mobile system 900 with power. In some embodiments, the mobile system 900 may further include a camera image processor (CIS), and a modem, such as a baseband chipset. For example, the modem may be a modem processor that supports at least one of various communications, such as GSM, GPRS, WCDMA, HSxPA, etc.

According to an exemplary embodiment of the present disclosure, the mobile system 900 and/or components of the mobile system 900 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

Figure 19:
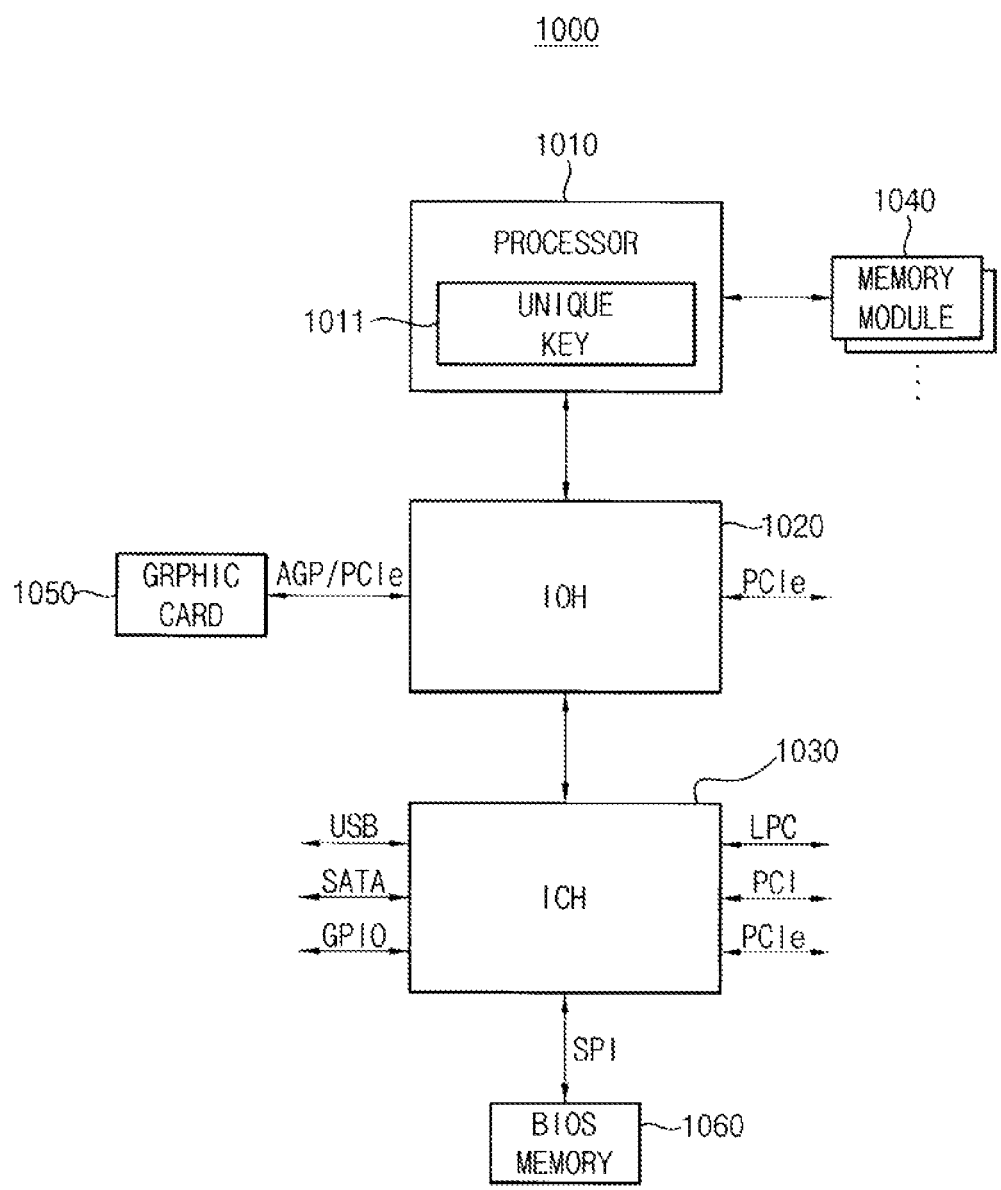
FIG. 19 is a block diagram illustrating a computing system according to exemplary embodiments.

FIG. 19 is a block diagram illustrating a computing system according to an exemplary embodiment of the present disclosure.

Referring to FIG. 19, a computing system 1000 includes a processor 1010, an input/output hub 1020, an input/output controller hub 1030, at least one memory module 1040, a graphic card 1050, and a basic input basic output (BIOS) memory 1060. According to an exemplary embodiment of the present disclosure, the computing system 1000 may be any computing system, such as a personal computer (PC), a server computer, a workstation, a tablet computer, a laptop computer, a mobile phone, a smart phone, a personal digital assistant (PDA), a portable multimedia player (PMP), a digital camera, a digital television, a set-top box, a music player, a portable game console, a navigation device, etc.

The processor 1010 may perform specific calculations or tasks. For example, the processor 1010 may be a microprocessor, a central process unit (CPU), a digital signal processor, or the like. The processor 1010 may store a unique key 1011 that is unique for each computing system. When the processor 1010 executes a boot image stored in the BIOS memory 1060, the processor 1010 may verify a message authentication code included in the boot image using the unique key 1011. Accordingly, confidentiality and integrity of the boot image may be maintained, and the computing system 1000 may perform a secure boot operation using an authenticated boot image. According to an exemplary embodiment of the present disclosure, the processor 1010 may include one processor core or multiple processor cores. For example, the processor 1010 may be a multi-core processor, such as a dual-core processor, a quad-core processor, a hexa-core processor, etc. Although FIG. 19 illustrates an example of the computing system 1000 including one processor 1010, the computing system 1000 according to an exemplary embodiment of the present disclosure may include one or more processors.

The processor 1010 may include a memory controller (not shown) that controls an operation of the memory module 1040. The memory controller included in the processor 1010 may be referred to as an integrated memory controller (IMC). A memory interface between the memory module 1040 and the memory controller may be implemented by one channel including a plurality of signal lines, or by a plurality of channels. Each channel may be coupled to at least one memory module 1040. In some embodiments, the memory controller may be included in the input/output hub 1020. The input/output hub 1020 including the memory controller may be referred to as a memory controller hub (MCH).

The input/output hub 1020 may manage data transfer between the processor 1010 and devices, such as the graphic card 1050. The input/output hub 1020 may be coupled to the processor 1010 via one of various interfaces, such as a front side bus (FSB), a system bus, a HyperTransport, a lightning data transport (LDT), a QuickPath interconnect (QPI), a common system interface (CSI), etc. Although FIG. 19 illustrates an example of the computing system 1000 including one input/output hub 1020, in some embodiments, the computing system 1000 may include a plurality of input/output hubs.

The input/output hub 1020 may provide various interfaces with the devices. For example, the input/output hub 1020 may provide an accelerated graphics port (AGP) interface, a peripheral component interface-express (PCIe), a communications streaming architecture (CSA) interface, etc.

The graphic card 1050 may be coupled to the input/output hub 1020 via the AGP or the PCIe. The graphic card 1050 may control a display device (not shown) for displaying an image. The graphic card 1050 may include an internal processor and an internal memory to process the image. In some embodiments, the input/output hub 1020 may include an internal graphic device along with or instead of the graphic card 1050. The internal graphic device may be referred to as an integrated graphics, and an input/output hub including the memory controller and the internal graphic device may be referred to as a graphics and memory controller hub (GMCH).

The input/output controller hub 1030 may perform data buffering and interface arbitration to efficiently operate various system interfaces. The input/output controller hub 1030 may be coupled to the input/output hub 1020 via an internal bus. For example, the input/output controller hub 1030 may be coupled to the input/output hub 1020 via one of various interfaces, such as a direct media interface (DMI), a hub interface, an enterprise Southbridge interface (ESI), PCIe, etc. The input/output controller hub 1030 may provide various interfaces with peripheral devices. For example, the input/output controller hub 1030 may provide a universal serial bus (USB) port, a serial advanced technology attachment (SATA) port, a general purpose input/output (GPIO), a low pin count (LPC) bus, a serial peripheral interface (SPI), a PCI, a PCIe, etc.

The BIOS memory 1060 may be coupled to the input/output controller hub 1030 via the SPI or the LPC bus. The BIOS memory 1060 may store the boot image for booting the computing system 1000. The boot image may include the message authentication code as well as a digital signature. The digital signature may be verified using a public key, and the message authentication code may be verified using the unique key 1011. According to an exemplary embodiment of the present disclosure, the boot image may further include an update public key for updating the public key, purpose information for preventing the mobile system 1000 from being booted by a leaked boot image for development or mass product, and/or a build number for preventing the boot image from being updated to an older boot image.

In some embodiments, the processor 1010, the input/output hub 1020 and the input/output controller hub 1030 may be implemented as separate chipsets or separate integrated circuits. In other embodiments, at least two of the processor 1010, the input/output hub 1020 and the input/output controller hub 1030 may be implemented as one chipset.

The foregoing is illustrative of exemplary embodiments and is not to be construed as limiting thereof. Although a few exemplary embodiments have been described, those skilled in the art will readily appreciate that many modifications are possible in exemplary embodiments described herein without materially departing from the novel teachings and advantages of the inventive concepts. Accordingly, all such modifications are intended to be included within the scope of the present disclosure as defined in the claims. Therefore, it is to be understood that the foregoing is illustrative of various exemplary embodiments and is not to be construed as limited to specifically disclosed exemplary embodiments, and that modifications to disclosed exemplary embodiments, as well as other exemplary embodiments, are intended to be included within the scope of the appended claims.

What is claimed is:

1. A secure boot method, comprising:
    verifying, by an initial boot loader, a first digital signature included in a first boot loader using a public key;
    executing the first boot loader upon determining the first digital signature to be valid;
    verifying, by the first boot loader, a first message authentication code included in a second boot loader using a unique key;
    executing the second boot loader upon determining the first message authentication code to be valid;
    comparing a first build number included in the second boot loader stored in a nonvolatile memory device to a second build number included in an update boot loader stored in a volatile memory device; and
    overwriting the second boot loader with the update boot loader in the nonvolatile memory device upon determining that the second build number is higher than the first build number.

2. The secure boot method of claim 1, wherein verifying the first digital signature comprises:
    reading the public key from a public key storing unit; and
    checking integrity of an execution image included in the first boot loader by verifying the first digital signature using the read public key.

3. The secure boot method of claim 1, wherein verifying the first message authentication code comprises:
    reading the unique key from a unique key storing unit;
    generating a message authentication code using the read unique key and an execution image included in the second boot loader; and
    comparing the generated message authentication code to the first message authentication code.

4. The secure boot method of claim 3, wherein the unique key is read from the unique key storing unit via a unique key firewall, and
    wherein the unique key firewall is configured to block an access to the unique key storing unit after a boot operation is completed.

5. The secure boot method of claim 3, wherein the unique key storing unit is a secure peripheral device inaccessible after a boot operation is completed.

6. The secure boot method of claim 3, wherein a physical address of the unique key storing unit is not included in mapping information managed by a memory management unit.

7. The secure boot method of claim 1, further comprising:
    reading the public key from a public key storing unit; and
    verifying a second digital signature included in the second boot loader using the read public key,
    wherein the second boot loader is executed upon determining the first message authentication code and the second digital signature to be valid.

8. The secure boot method of claim 1, further comprising:
    verifying a second digital signature included in the second boot loader using a public key included in the first boot loader,
    wherein the second boot loader is executed upon determining the first message authentication code and the second digital signature to be valid.

9. The secure boot method of claim 1, further comprising:
    comparing, by the second boot loader, first purpose information included in the first boot loader to second purpose information included in the second boot loader; and
    terminating a system upon determining a mismatch between the first purpose information and the second purpose information.

10. The secure boot method of claim 1, further comprising:
    verifying, by the second boot loader, a second message authentication code included in a kernel using the unique key; and
    executing the kernel upon determining the second message authentication code to be valid.

11. The secure boot method of claim 1, further comprising:
    generating a message authentication code using the unique key and an execution image included in the update boot loader; and
    writing the generated message authentication code as the first message authentication code of the second boot loader overwritten with the update boot loader.

12. A secure boot system comprising:
    an integrated circuit comprising:
        a processor for executing a boot image; and
        a unique key storing unit storing a unique key for authenticating the message authentication code;
    an external nonvolatile memory device for storing a second boot loader including a first build number and a message authentication code; and
    an external volatile memory device for storing an update boot loader including a second build number;
    wherein the first build number is compared with the second build number and the second boot loader is overwritten with the update boot loader upon determining that the second build number is higher than the first build number.

13. The secure boot system of claim 12, wherein the unique key storing unit further comprises:
    a memory device storing the unique key;
    a unique key firewall; and
    a control circuit controlling the unique key firewall not to output the unique key after a boot operation is completed by the secure boot system.

14. The secure boot system of claim 13, wherein the memory device is one-time programmable.

15. The secure boot system of claim 12, wherein the processor further comprises a secure kernel in communication with the unique key storing unit.

16. The secure boot system of claim 12, further comprising a memory management unit disposed between the processor and the unique key storing unit, wherein the memory management unit does not store a physical address of the unique key storing unit.

17. The secure boot system of claim 12, wherein the message authentication code in the second boot loader is generated using the unique key and an execution image included in the update boot loader, and wherein the generated message authentication code is written as the first message authentication code of the second boot loader overwritten with the update boot loader.

* * * * *